(12) United States Patent
Inabe

(10) Patent No.: US 7,820,748 B2
(45) Date of Patent: Oct. 26, 2010

(54) INSULATING FILM FORMING COMPOSITION AND ELECTRONIC DEVICE

(75) Inventor: Haruki Inabe, Shizuoka (JP)

(73) Assignee: Fujifilm Corporation, Tokyo (JP)

( * ) Notice: Subject to any disclaimer, the term of this patent is extended or adjusted under 35 U.S.C. 154(b) by 216 days.

(21) Appl. No.: 12/209,480

(22) Filed: Sep. 12, 2008

(65) Prior Publication Data

US 2009/0076204 A1 Mar. 19, 2009

(30) Foreign Application Priority Data

Sep. 14, 2007 (JP) .............................. 2007-239149

(51) Int. Cl.
C08K 5/5415 (2006.01)
C08K 5/5419 (2006.01)

(52) U.S. Cl. ................... 524/261; 525/342; 428/304.4; 428/308.4

(58) Field of Classification Search ................ 525/342; 524/261; 428/304.4, 308.4
See application file for complete search history.

(56) References Cited

U.S. PATENT DOCUMENTS

| | | | |
|---|---|---|---|
| 5,965,679 A | | 10/1999 | Godschalx et al. |
| 6,252,030 B1 * | | 6/2001 | Zank et al. ..................... 528/31 |
| 6,451,437 B1 * | | 9/2002 | Amidaiji et al. ............. 428/447 |
| 6,465,368 B2 * | | 10/2002 | Inoue et al. .................. 438/780 |
| 6,586,548 B2 * | | 7/2003 | Bonafini et al. ............. 526/279 |
| 6,632,748 B2 * | | 10/2003 | Yim et al. .................... 438/780 |
| 6,916,543 B2 * | | 7/2005 | De et al. ...................... 428/447 |
| 7,144,453 B2 * | | 12/2006 | Yim et al. .................... 106/122 |
| 7,169,477 B2 * | | 1/2007 | Lyu et al. ...................... 428/447 |
| 2002/0192980 A1 * | | 12/2002 | Hogle et al. ................. 438/778 |
| 2003/0214715 A1 * | | 11/2003 | Bermel ........................ 359/485 |
| 2004/0120915 A1 * | | 6/2004 | Yang et al. ............... 424/70.13 |
| 2005/0059551 A1 * | | 3/2005 | Foster et al. ................. 503/227 |
| 2005/0276964 A1 * | | 12/2005 | Watanabe et al. ......... 428/304.4 |
| 2006/0100410 A1 * | | 5/2006 | Ootake et al. ................. 528/33 |
| 2006/0116499 A1 * | | 6/2006 | Ootake et al. ................... 528/9 |
| 2007/0054135 A1 * | | 3/2007 | Morita et al. ................ 428/447 |
| 2007/0073020 A1 * | | 3/2007 | Watanabe et al. ........... 526/285 |
| 2007/0135585 A1 * | | 6/2007 | Hiraoka et al. .............. 525/342 |
| 2007/0135603 A1 * | | 6/2007 | Asano ......................... 526/280 |
| 2007/0255003 A1 * | | 11/2007 | Watanabe et al. ........... 524/553 |
| 2008/0171846 A1 * | | 7/2008 | Ootake et al. ................. 528/25 |

FOREIGN PATENT DOCUMENTS

| | | |
|---|---|---|
| JP | 2003-176352 A | 6/2003 |
| JP | 2006-233128 A | 9/2006 |
| JP | 2006-265513 A | 10/2006 |
| JP | 2007-119706 A | 5/2007 |

* cited by examiner

*Primary Examiner*—Randy Gulakowski
*Assistant Examiner*—Robert Loewe
(74) *Attorney, Agent, or Firm*—Sughrue Mion, PLLC

(57) ABSTRACT

An insulating film forming composition includes: (A) at least one organic polymer; (B) a solvent; and (C) at least one organic silicone compound represented by any of the following formulas (C-1) to (C-3) as defined in the specification:

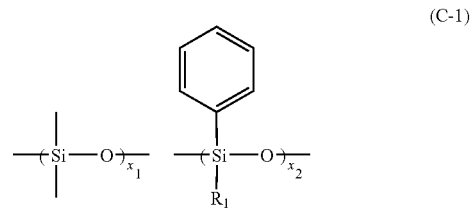

(C-1)

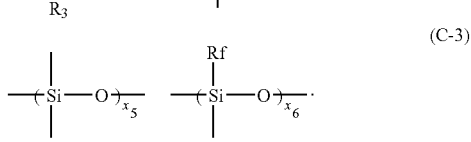

(C-2)

(C-3)

10 Claims, No Drawings

INSULATING FILM FORMING COMPOSITION AND ELECTRONIC DEVICE

BACKGROUND OF THE INVENTION

1. Field of the Invention

The present invention relates to an insulating film forming composition and an electronic device, more specifically, a production process of a composition for forming an insulating film excellent in film properties such as dielectric constant, mechanical strength, and heat resistance and used for electronic devices. The invention also pertains to an insulating film forming composition produced by the above-described production process, and an electronic device having an insulating film available using the composition.

2. Description of the Related Art

With the recent progress of high integration, multifunction and high performance in semiconductor integrated circuits (ICs), circuit resistance and interconnect capacitance have increased, leading to an increase in power consumption and delay time. Particularly, an increase of delay time has caused a reduction of signal speed and generation of crosstalk in semiconductor integrated circuits so that a reduction of interconnect resistance and parasitic capacitance is required in order to decrease this delay time and accelerate the speed of the semiconductor integrated circuits. As one concrete measure for reducing this parasitic capacitance, an attempt has been made to cover the periphery of interconnects with a low-dielectric-constant insulating film. In addition, this insulating film is required to have heat resistance high enough to withstand a thin film formation step at the time of producing a mounting board and post steps such as chip connection and pin insertion and also chemical resistance high enough to withstand a wet process. Moreover, Al interconnects have recently been replaced by low resistance Cu interconnects and it is therefore common practice to carry out planarization by CMP (chemical mechanical polishing). The insulating film is therefore required to have mechanical resistance high enough to withstand this process.

As an insulating film for covering the periphery of an interconnect, silicon dioxide ($SiO_2$, k=3.9) has conventionally been used. However, use of a spin-coated insulating film having a relatively easily controllable film structure is now investigated for reducing a dielectric constant of an insulating film. Insulating film forming materials are disclosed, for example, in Japanese Patent Laid-Open No. 2003-176352, U.S. Pat. No. 5,965,679, Japanese Patent Laid-Open No. 2006-233128, Japanese Patent Laid-Open No. 2006-265513, and Japanese Patent Laid-Open No. 2007-119706.

On the other hand, insulating films to be used in semiconductor devices must have a stable dielectric constant even after film formation. For example, a gradual increase in the dielectric constant of a coated film due to absorption of environmental moisture after film formation is not preferred because it adversely affects the performance of semiconductor devices manufactured using such a film. In such a case, it is indispensable to evaporate water absorbed into the film by carrying out heat treatment subsequent to an insulating film forming step to restore the original dielectric constant. In the above-described insulating film forming materials, however, their dielectric constant may rise with the passage of time after film formation so that there is a room for further improvement of a dielectric constant restoration property by heat treatment.

SUMMARY OF THE INVENTION

An object of the invention is to provide, in view of the above-described problem of insulating film forming materials, an insulating film forming composition having a low dielectric constant and improved in capacity (k-value restoration property) of restoring the original dielectric constant which has once increased with the passage of time after film formation.

The present inventors have found that the above-described object can be achieved by the following means.

(1) An insulating film forming composition, comprising:
(A) at least one organic polymer;
(B) a solvent; and
(C) at least one organic silicone compound represented by any of the following formulas (C-1) to (C-3):

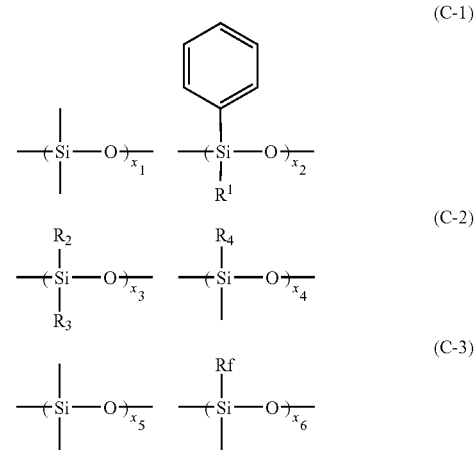

wherein, in formula (C-1), $R_1$ represents a methyl group or a phenyl group; and $x_1$ is from 0 to 95 mol % and $x_2$ is from 5 to 100 mol %, with the proviso that $x_1+x_2=100$ mol %;

in formula (C-2), $R_2$ and $R_3$ each represents an alkyl group, with the proviso that at least one of $R_2$ and $R_3$ represents an alkyl group having 2 or more carbon atoms; $R_4$ represents a methyl group or a 2-phenylpropyl group; and $x_3$ is from 5 to 100 mol % and $x_4$ is from 0 to 95 mol %, with the proviso that $x_3+x_4=100$ mol %; and in formula (C-3), Rf represents a fluoroalkyl group; and $x_5$ is from 0 to 95 mol % and $x_6$ is from 5 to 100 mol %, with the proviso that $x_5+x_6=100$ mol %.

(2) The insulating film forming composition as described in (1) above, wherein the at least one organic silicone compound (C) is at least one compound represented by formula (C-2).

(3) The insulating film forming composition as described in (1) or (2) above, wherein the at least one organic polymer (A) is a polymer of a monomer having at least one repeating unit containing a cage structure.

(4) The insulating film forming composition as described in any of (1) to (3) above, wherein the at least one organic polymer (A) is a polymer of a monomer containing a cage structure and having a polymerizable carbon-carbon double bond or carbon-carbon triple bond.

(5) The insulating film forming composition as described in (3) or (4) above, wherein the cage structure is selected from the group consisting of adamantane, biadamantane, diamantane, triamantane, tetramantane and dodecahedrane.

(6) The insulating film forming composition as described in (5) above, wherein the monomer containing a cage structure is selected from the group consisting of the following formulas (I) to (VI):

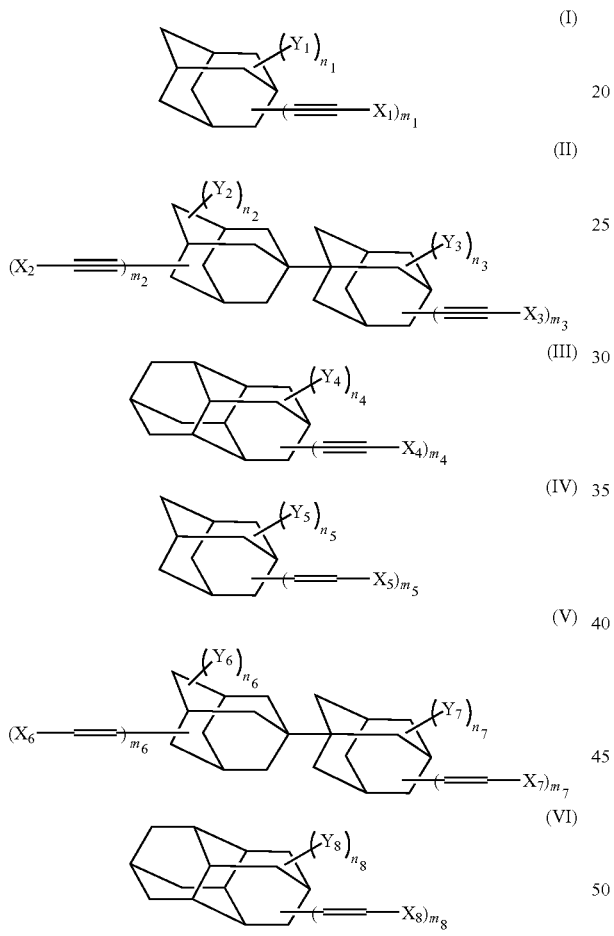

wherein, in the formulas (I) to (VI), $X_1(s)$ to $X_8(s)$ each independently represents a hydrogen atom, an alkyl group, an alkenyl group, an alkynyl group, an aryl group, a silyl group, an acyl group, an alkoxycarbonyl group or a carbamoyl group;

$Y_1(s)$ to $Y_8(s)$ each independently represents a halogen atom, an alkyl group, an aryl group or a silyl group;

$m_1$ and $m_5$ each independently stands for an integer from to 16;

$n_1$ and $n_5$ each independently stands for an integer from to 15;

$m_2$, $m_3$, $m_6$ and $m_7$ each independently stands for an integer from 1 to 15;

$n_2$, $n_3$, $n_6$ and $n_7$ each independently stands for an integer from 0 to 14;

$m_4$ and $m_8$ each independently stands for an integer from 1 to 20; and $n_4$ and $n_8$ each independently stands for an integer from to 19.

(7) An insulating film forming composition, comprising:

(A) a high molecular weight compound obtained by polymerizing a cage-type silsesquioxane compound having two or more unsaturated groups as substituents;

(B) a solvent; and (C) at least one organic silicone compound represented by any of the following formulas (C-1) to (C-3):

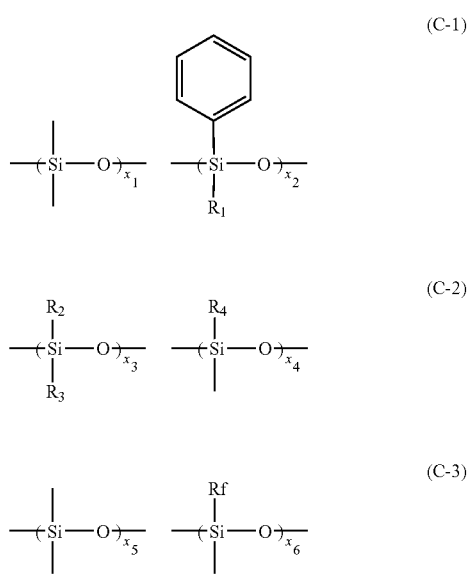

wherein, in formula (C-1), $R_1$ represents a methyl group or a phenyl group; and $x_1$ is from 0 to 95 mol % and $x_2$ is from 5 to 100 mol %, with the proviso that $x_1+x_2=100$ mol %;

in formula (C-2), $R_2$ and $R_3$ each represents an alkyl group, with the proviso that at least one of $R_2$ and $R_3$ represents an alkyl group having 2 or more carbon atoms; $R_4$ represents a methyl group or a 2-phenylpropyl group; and $x_3$ is from 5 to 100 mol % and $x_4$ is from 0 to 95 mol %, with the proviso that $x_3+x_4=100$ mol %; and in formula (C-3), Rf represents a fluoroalkyl group; and $x_5$ is from 0 to 95 mol % and $x_6$ is from 5 to 100 mol %, with the proviso that $x_5+x_6=100$ mol %.

(8) The insulating film forming composition as described in (7) above, wherein the at least one organic silicone compound (C) is at least one compound represented by formula (C-2).

(9) The insulating film forming composition as described in (7) or (8) above, wherein the cage-type silsesquioxane compound serving as a raw material of the high molecular weight compound (A) is selected from the group consisting of the following formulas (Q-1) to (Q-6):

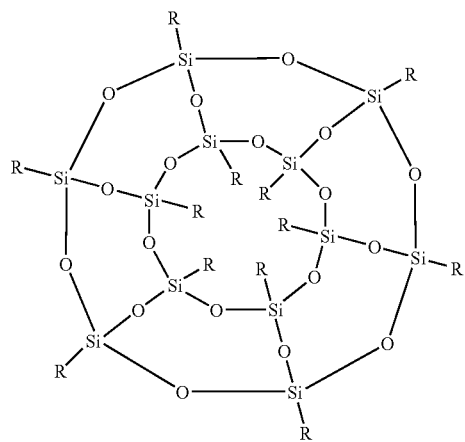
(Q-1)

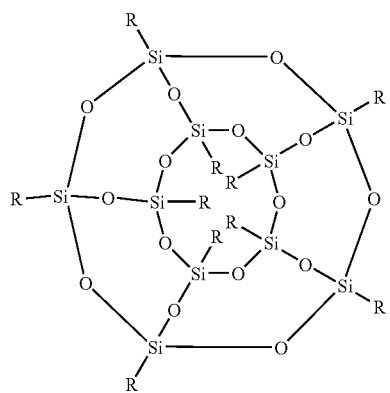
(Q-2)

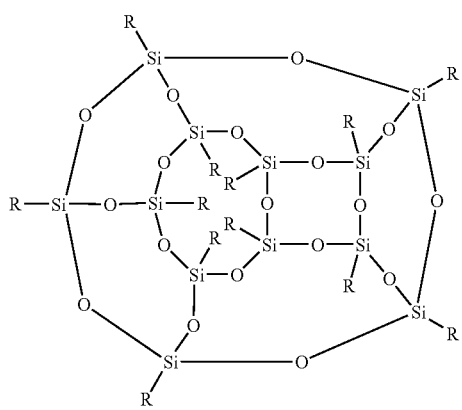
(Q-3)

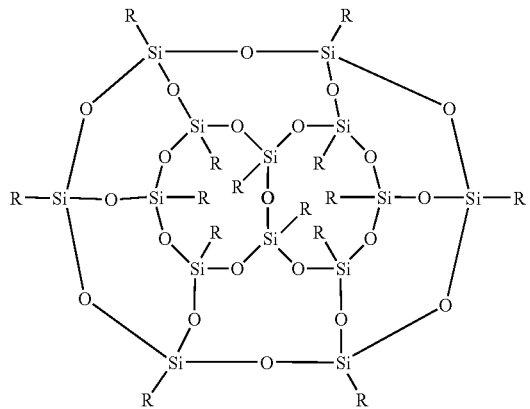
(Q-4)

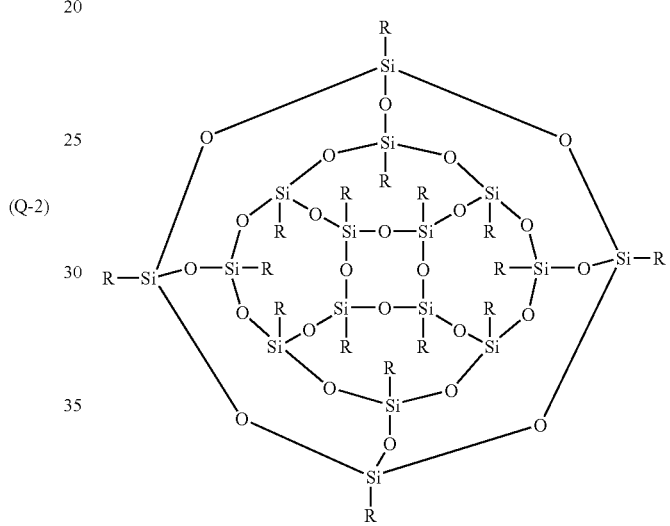
(Q-5)

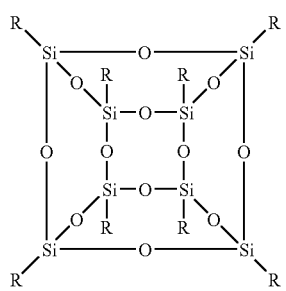
(Q-6)

wherein,
R's each independently represents a non-hydrolyzable group with the proviso that at least two of R's represent a vinyl- or ethynyl-containing group.

(10) An electronic device, comprising:
an insulating film formed from the insulating film forming composition as described in any of (1) to (9) above.

DETAILED DESCRIPTION OF THE INVENTION

The insulating film forming composition (which may herein after be called "composition") of the invention will next be described in detail. (The term "insulating film" is also referred to as "dielectric film" and "dielectric insulating film", but these terms are not substantially distinguished (C) Organic Silicone Compound The insulating film forming composition of the invention contains at least one organic silicone compound (C) represented by any of the following formulas (C-1) to (C-3):

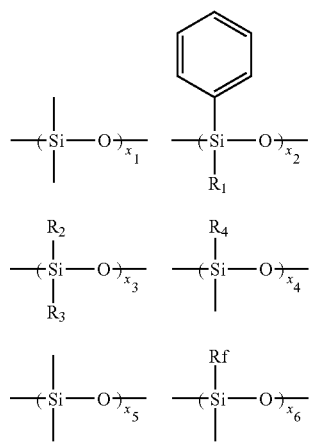

In the formula (C-1), $R_1$ represents a methyl group or a phenyl group.

$R_1$ represents preferably a phenyl group.

$x_1$ is from 0 to 95 mol % and $x_2$ is from 5 to 100 mol %, with the proviso that $x_1+x_2=100$ mol %.

$x_1$ is preferably from 0 to 90 mol %, more preferably from 0 to 80 mol %. $x_2$ is preferably from 10 to 100 mol %, more preferably from 20 to 100 mol %.

In the formula (C-2), $R_2$ and $R_3$ each represents a $C_{1-20}$ alkyl group, with the proviso that at least one of $R_2$ and $R_3$ represents an alkyl group having from 2 to 20 carbon atoms.

The alkyl group as $R_2$ or $R_3$ is not limited and it may be any of linear, branched, and cyclic alkyl groups. It is preferably a linear or branched alkyl group, more preferably a linear alkyl group. Specific examples of the alkyl group usable here include ethyl, propyl, butyl, pentyl, hexyl, heptyl, octyl, nonyl, decanyl, undecanyl, dodecanyl, tetradecanyl, octadecanyl, isopropyl, t-butyl, isooctyl, and cyclohexyl. Of these, ethyl, hexyl, dodecanyl, tetradecanyl, and octadecanyl groups are preferred, with ethyl and hexyl groups being more preferred and a hexyl group being most preferred.

$R_4$ represents a methyl group or a 2-phenylpropyl group, preferably a 2-phenylpropyl group.

$x_3$ is from 5 to 100 mol % and $x_4$ is from 0 to 95 mol %, with the proviso that $x_3+x_4=100$ mol %.

$x_3$ is preferably from 20 to 90 mol %, more preferably from 30 to 80 mol %. $x_4$ is preferably from 10 to 80 mol %, more preferably from 20 to 70 mol %.

In the formula (C-3), Rf represents a $C_{1-12}$ fluoroalkyl group. As the fluoroalkyl group of Rf, a 3,3,3-trifluoropropyl group is preferred.

$x_5$ is from 0 to 95 mol % and $x_6$ is from 5 to 100 mol %, with the proviso that $x_5+x_6=100$ mol %.

$x_5$ is preferably from 0 to 80 mol %, more preferably from 0 to 60 mol %, while $x_6$ is preferably from 20 to 100 mol %, more preferably from 40 to 100 mol %.

Addition of the organic silicone compound (C) represented by any of the formulas (C-1) to (C-3) as a component of the insulating film forming composition of the invention facilitates, by heat treatment, restoration of a dielectric constant to that immediately after film formation even if the dielectric constant rises with the passage of time after film formation.

This is presumed to occur because addition of the organic silicone compound (C) improves the molecular motility on the surface region of a coated film during heat treatment and facilitates evaporation of environmental moisture incorporated in the film with the passage of time.

As the organic silicone compound (C) to be incorporated in the insulating film forming composition of the invention, commercially available ones are usable. Examples include phenylsilicones (PDM and PMM series), alkyl-modified silicones (ALT series), and fluorosilicones (FMS series), each, product of Gelest, and methylphenylsilicones ("SH510", "SH550", and "SH710", trade name), alkyl-modified silicone oils ("SH203", "SH230", "SH8416", "BY16-846", and "FZ-49", trade name), and fluorine-modified silicones (FS-1265 series), each, product of Dow Corning Toray Silicone.

In the insulating film forming composition of the invention, the organic silicone compound (C) is incorporated in an amount of from 1.0 to 20.0 mass %, more preferably from 3.0 to 15.0 mass %, most preferably from 5.0 to 10.0 mass %, each based on the total solid content constituting the composition. (In this specification, mass ratio is equal to weight ratio.)

The organic silicon compound (C) to be incorporated in the insulating film forming composition of the invention is not particularly limited insofar as it is represented by any of the above-described formulas (C-1), (C-2), and (C-3), but alkyl-modified silicones represented by the formula (C-2) are more preferred.

The following are specific structural formulas of the compounds usable as the organic silicone compound (C) to be incorporated in the insulating film forming composition of the invention, but the invention is not limited by them.

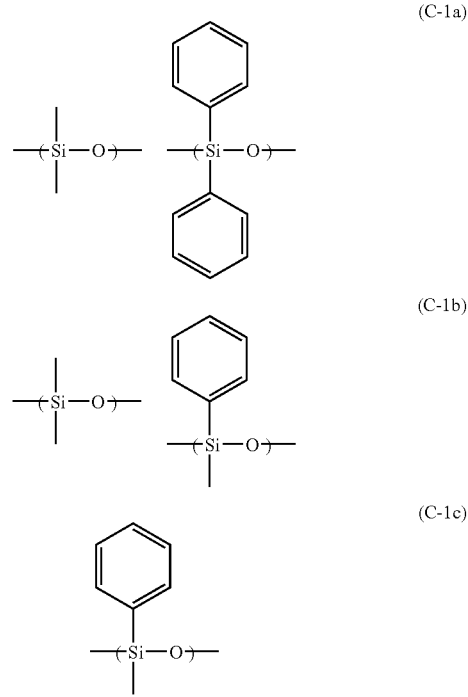

-continued

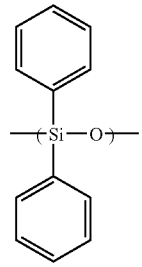
(C-1d)

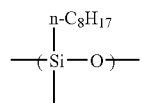
(C-2a)

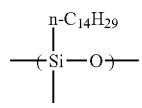
(C-2b)

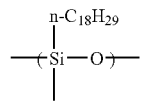
(C-2c)

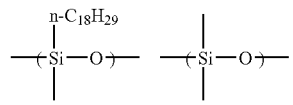
(C-2d)

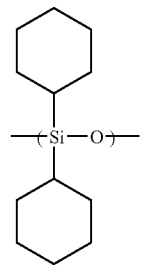
(C-2e)

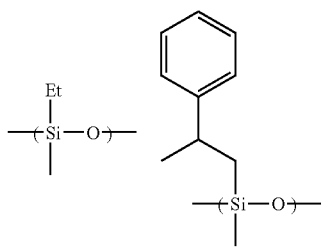
(C2-f)

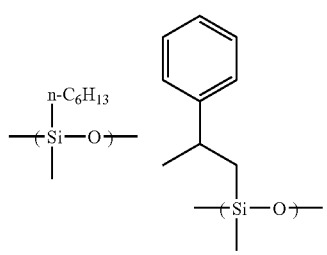
(C2-g)

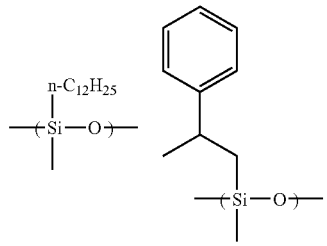
(C-2h)

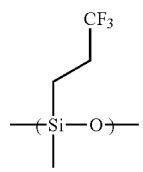
(C3-a)

(A) High Molecular Weight Compound

The insulating film forming composition in the invention contains at least one organic polymer. The term "organic polymer" as used herein means a polymer having a polymer main chain composed only of C, O, and N elements. The organic polymer usable in the invention preferably has at least one repeating unit having a "cage structure".

The term "cage structure" as used herein means a molecule in which plural rings formed of covalent-bonded atoms define the capacity of the structure and in which all points existing inside the capacity cannot leave the capacity without passing through the rings. For example, an adamantane structure may be considered as the cage structure. On the other hand, a cyclic structure having a single crosslink which norbornane (bicyclo[2,2,1]heptane) or the like has cannot be considered as the cage structure because the ring of the single-crosslinked cyclic compound does not define the capacity of the compound.

The cage structure in the invention is preferably an alicylic hydrocarbon structure (which will herein after be called "cage structure (a)") such as adamantane, biadamantane, diamantane, triamantane, tetramantane, or dodecahedrane.

Examples of the cage structure (a) include adamantane, biadamantane, diamantane, triamantane, tetramantane, and dodecahedrane. Of these, adamantane, biadamantane, and diamantane are more preferred, with biadamantane and diamantane being especially preferred because they have a low dielectric constant.

The cage structure (a) in the invention may have one or more substituents. Examples of the substituents include halogen atoms (fluorine, chlorine, bromine and iodine), linear, branched or cyclic $C_{1-10}$ alkyl groups (such as methyl, t-butyl, cyclopentyl and cyclohexyl), $C_{2-10}$ alkenyl groups (such as vinyl and propenyl), $C_{2-10}$ alkynyl groups (such as ethynyl and phenylethynyl), $C_{6-20}$ aryl groups (such as phenyl, 1-naphthyl, and 2-naphthyl), $C_{2-10}$ acyl groups (such as benzoyl), $C_{2-10}$ alkoxycarbonyl groups (such as methoxycarbonyl), $C_{1-10}$ carbamoyl groups (such as N,N-diethylcarbamoyl), $C_{6-20}$ aryloxy groups (such as phenoxy), $C_{6-20}$ arylsulfonyl groups (such phenylsulfonyl), nitro group, cyano group, and silyl groups (such as triethoxysilyl, methyldiethoxysilyl and trivinylsilyl).

The polymerization reaction of a monomer having the cage structure (a) starts by a polymerizable group substituted for the monomer. The term "polymerizable group" as used herein means a reactive substituent which polymerizes the monomer. Although the polymerization reaction is not limited, examples include radical polymerization, cationic polymerization, anionic polymerization, ring-opening polymerization, polycondensation, polyaddition, addition condensation, and polymerization using a transition metal catalyst.

The polymerization reaction of a monomer having the cage structure (a) in the invention is preferably carried out in the presence of a non-metallic polymerization initiator. For example, a monomer having a polymerizable carbon-carbon double bond or carbon-carbon triple bond can be polymerized in the presence of a polymerization initiator which generates free radicals such as carbon radicals or oxygen radicals by heating, thereby showing activity.

As the polymerization initiator, organic peroxides and organic azo compounds are preferred, of which organic peroxides are especially preferred.

Preferred examples of the organic peroxides include ketone peroxides such as "PERHEXA H", peroxyketals such as "PERHEXA TMH", hydroperoxides such as "PERBUTYL H-69", dialkylperoxides such as "PERCUMYL D", "PERBUTYL C" and "PERBUTYL D", diacyl peroxides such as "NYPER BW", peroxy esters such as "PERBUTYL Z" and "PERBUTYL L", and peroxy dicarbonates such as "PEROYL TCP", (each, trade name; commercially available from NOF Corporation).

Examples of the organic azo compound include azonitrile compounds such as "V-30", "V-40", "V-59", "V-60", "V-65" and "V-70", azoamide compounds such as "VA-080", "VA-085", "VA-086", "VF-096", "VAm-110" and "VAm-111", cyclic azoamidine compounds such as "VA-044" and "VA-061", and azoamidine compounds such as "V-50" and VA-057" (each, trade name; commercially available from Wako Pure Chemical Industries).

These polymerization initiators for a monomer having the cage structure (a) may be used either singly or in combination. Their using amount is preferably from 0.001 to 2 mols, more preferably from 0.01 to 1 mol, especially preferably from 0.05 to 0.5 mol, per mol of the monomer.

The polymerization reaction of a monomer having the cage structure (a) in the invention may also be effected in the presence of a transition metal catalyst. For example, it is preferred to carry out polymerization of a monomer having a polymerizable carbon-carbon double bond or carbon-carbon triple bond in the presence of a Pd catalyst such as $Pd(PPh_3)_4$ or $Pd(OAc)_2$, a Ziegler-Natta catalyst, an Ni catalyst such as nickel acetylacetonate, a W catalyst such as $WCl_6$, an Mo catalyst such as $MoCl_5$, a Ta catalyst such as $TaCl_5$, an Nb catalyst such as $NbCl_5$, an Rh catalyst, or a Pt catalyst.

The above-described transition metal catalysts may be used either singly or in combination.

The amount of the transition metal catalyst is preferably from 0.001 to 2 mols, more preferably from 0.01 to 1 mol, especially preferably from 0.05 to 0.5 mol, each per mole of the monomer.

The cage structure (a) in the invention may be substituted as a pendant group in the high molecular weight compound (A) or may constitute a portion of the main chain of the high molecular weight compound (A), but the latter one is more preferred. When the cage structure constitutes a portion of the polymer main chain, the polymer chain is broken by the removal of the cage compound from the polymer. In this state, the cage structures (a) may be singly bonded directly or may be bonded by an appropriate divalent or higher valent linking group. Example of the linking group include $—C(R_{11})(R_{12})—$, $—C(R_{13})=C(R_{14})—$, $—C\equiv C—$, arylene group, $—CO—$, $—O—$ $—SO_2—$, $—N(R_{15})—$, and $—Si(R_{16})(R_{17})—$, and combinations thereof. In these groups, $R_{11}$ to $R_{17}$ each independently represents a hydrogen atom or an alkyl, alkenyl, alkynyl, or aryl group. These linking groups may be substituted by a substituent and the above-described substituents are preferably employed here.

Of these, $—C(R_{11})(R_{12})—$, $—CH=CH—$, $—C\equiv C—$, arylene group, $—O—$ and $—Si(R_{16})(R_{17})—$, and combinations thereof are more preferred, with $—C(R_{11})(R_{12})—$ and $—CH=CH—$ being especially preferred from the viewpoint of a low dielectric constant.

The high molecular weight compound (A) having the cage structure (a) in the invention has preferably a mass-average molecular weight (Mw) of from 1000 to 500000, more preferably from 2000 to 200000, especially preferably from 3000 to 100000.

The mass average molecular weight Mw is determined by GPC measurement and conversion based on a calibration curve made using standard polystyrene.

The high molecular weight compound (A) having the cage structure (a) in the invention is preferably a polymer of a monomer having a polymerizable carbon-carbon double bond or carbon-carbon triple bond. It is more preferably a polymer of a compound represented any of the following formulas (I) to (VI):

(I)

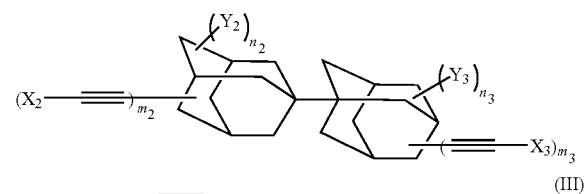

(II)

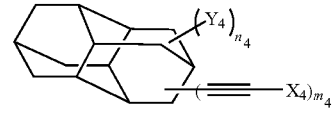

(III)

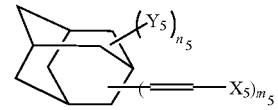

(IV)

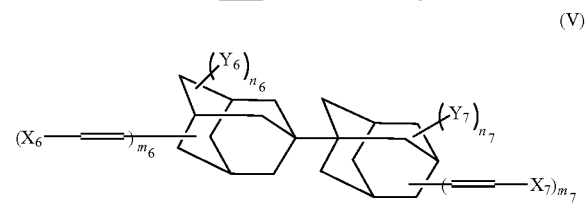

(V)

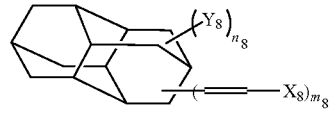

(VI)

In the formulas (I) to (VI), $X_1(s)$ to $X_8(s)$ each independently represents a hydrogen atom, a $C_{1-10}$ alkyl group, a $C_{2-10}$ alkenyl group, a $C_{2-10}$ alkynyl group, a $C_{6-20}$ aryl group, a $C_{0-20}$ silyl group, a $C_{2-10}$ acyl group, a $C_{2-10}$ alkoxycarbonyl group, or a $C_{1-20}$ carbamoyl group, of which a hydrogen atom, a $C_{1-10}$ alkyl group, a $C_{6-20}$ aryl group, a $C_{0-20}$ silyl group, a $C_{2-10}$ acyl group, a $C_{2-10}$ alkoxycarbonyl group, or a $C_{1-20}$ carbamoyl group is preferred; a hydrogen atom or a $C_{6-20}$ aryl group is more preferred; and a hydrogen atom is especially preferred.

$Y_1(s)$ to $Y_8(s)$ each independently represents a halogen atom (such as fluorine, chlorine or bromine), a $C_{1-10}$ alkyl group, a $C_{6-20}$ aryl group, or a $C_{6-20}$ silyl group, of which an optionally substituted $C_{1-10}$ alkyl group or $C_{6-20}$ aryl group is more preferred and an alkyl (such as methyl) group is especially preferred.

$X_1(s)$ to $X_8(s)$ and $Y_1(s)$ to $Y_8(s)$ may each be substituted further with another substituent.

In the above formulas, $m_1$ and $m_5$ each independently stands for an integer from 1 to 16, preferably from 1 to 4, more preferably from 1 to 3, especially preferably 2;

$n_1$ and $n_5$ each independently stands for an integer from 0 to 15; preferably from 0 to 4, more preferably 0 or 1, especially preferably 0;

$m_2$, $m_3$, $m_6$ and $m_7$ each independently stands for an integer from 1 to 15; preferably from 1 to 4, more preferably from 1 to 3, especially preferably 2;

$n_2$, $n_3$, $n_6$ and $n_7$ each independently stands for an integer from 0 to 14; preferably from 0 to 4, more preferably 0 or 1, especially preferably 0;

$m_4$ and $m_8$ each independently stands for an integer from 1 to 20; preferably from 1 to 4, more preferably from 1 to 3, especially preferably 2; and $n_4$ and $n_8$ each independently stands for an integer from 0 to 19, preferably from 0 to 4, more preferably 0 or 1, especially preferably 0.

A monomer having the cage structure (a) in the invention is preferably a compound represented by the above formula (II), (III), (V) or (VI), more preferably a compound represented by the formula (II) or (III) especially preferably a compound represented by the formula (III).

Two or more of the compounds having the cage structure (a) in the invention may be used in combination, or two or more of the monomers having the cage structure (a) in the invention may be copolymerized.

The high molecular weight compound (A) having the cage structure (a) in the invention preferably has a sufficient solubility in an organic solvent. The solubility is preferably 3 mass % or greater, more preferably 5 mass % or greater, especially preferably 10 mass % or greater, each at 25° C. in cyclohexanone or anisole.

Examples of the high molecular weight compound (A) having the cage structure (a) in the invention include polybenzoxazoles described in Japanese Patent Laid Open Nos. 1999-322929, 2003-12802, and 2004-18593, quinoline resins described in Japanese Patent Laid-Open No. 2001-2899, polyaryl resins described in International Patent Publication Nos. 2003-530464, 2004-535497, 2004-504424, 2004-504455, 2005-501131, 2005-516382, 2005-514479, and 2005-522528, Japanese Patent Laid-Open No. 2000-100808, and U.S. Pat. No. 6,509,415, polyadamantanes described in Japanese Patent Laid-Open Nos. 1999-214382, 2001-332542, 2003-252982, 2003-292878, 2004-2787, 2004-67877, and 2004-59444, and polyimides described in Japanese Patent Laid-Open Nos. 2003-252992 and 2004-26850.

Specific examples of the monomer having the cage structure (a) usable in the invention include, but are not limited to, the following ones.

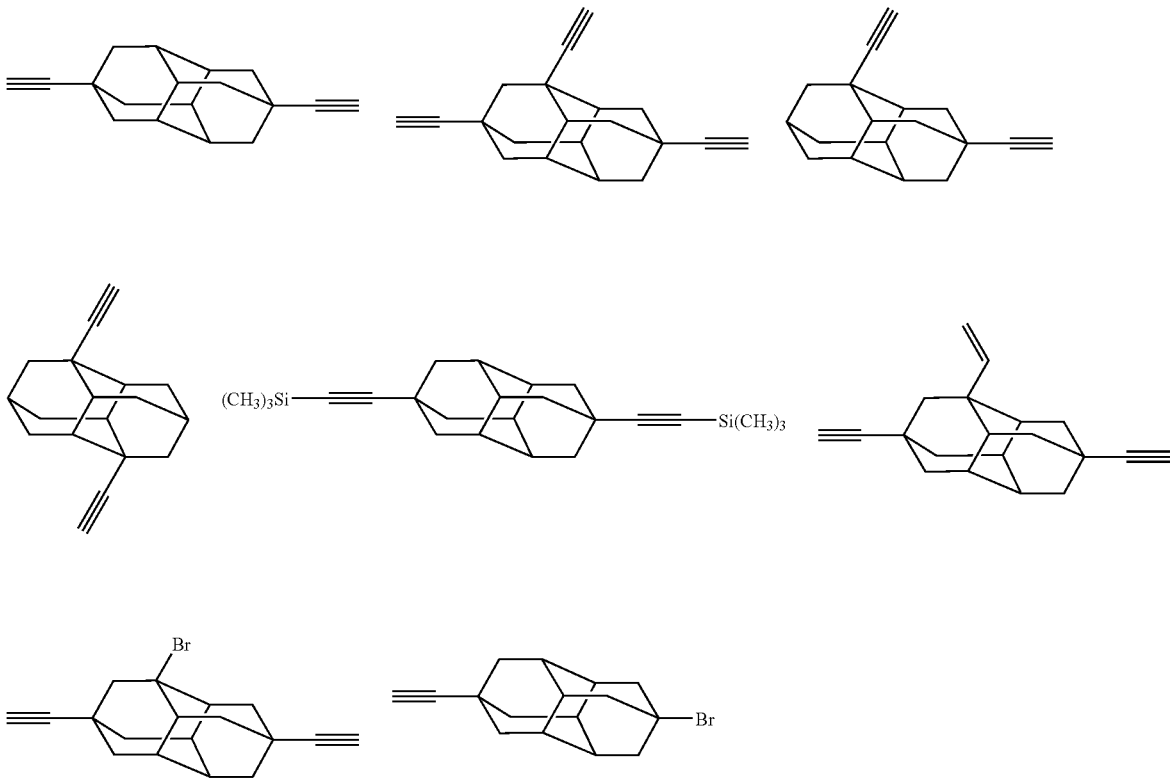

-continued
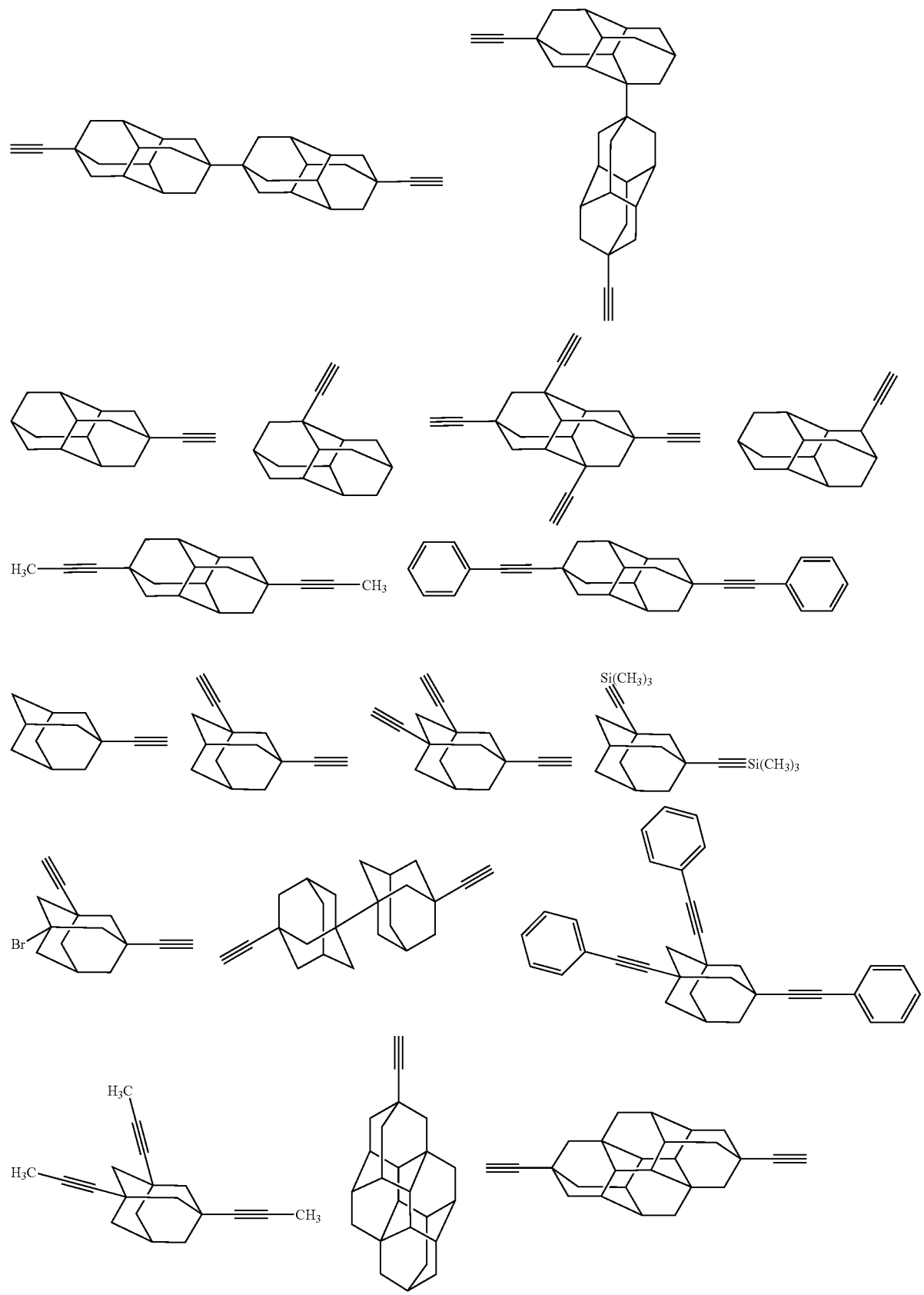

-continued
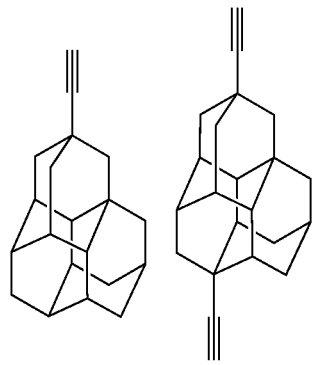
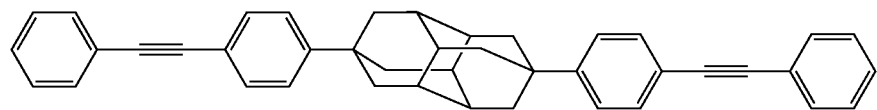
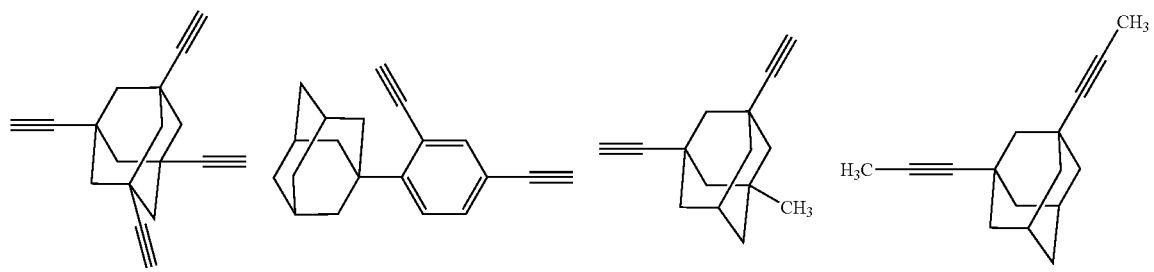
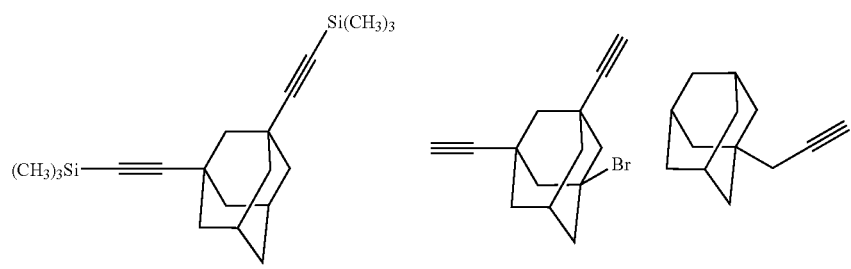
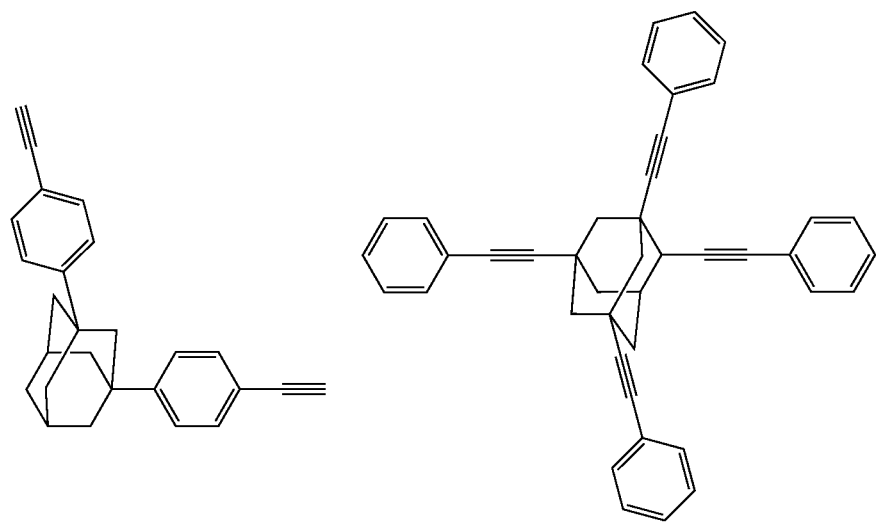

-continued
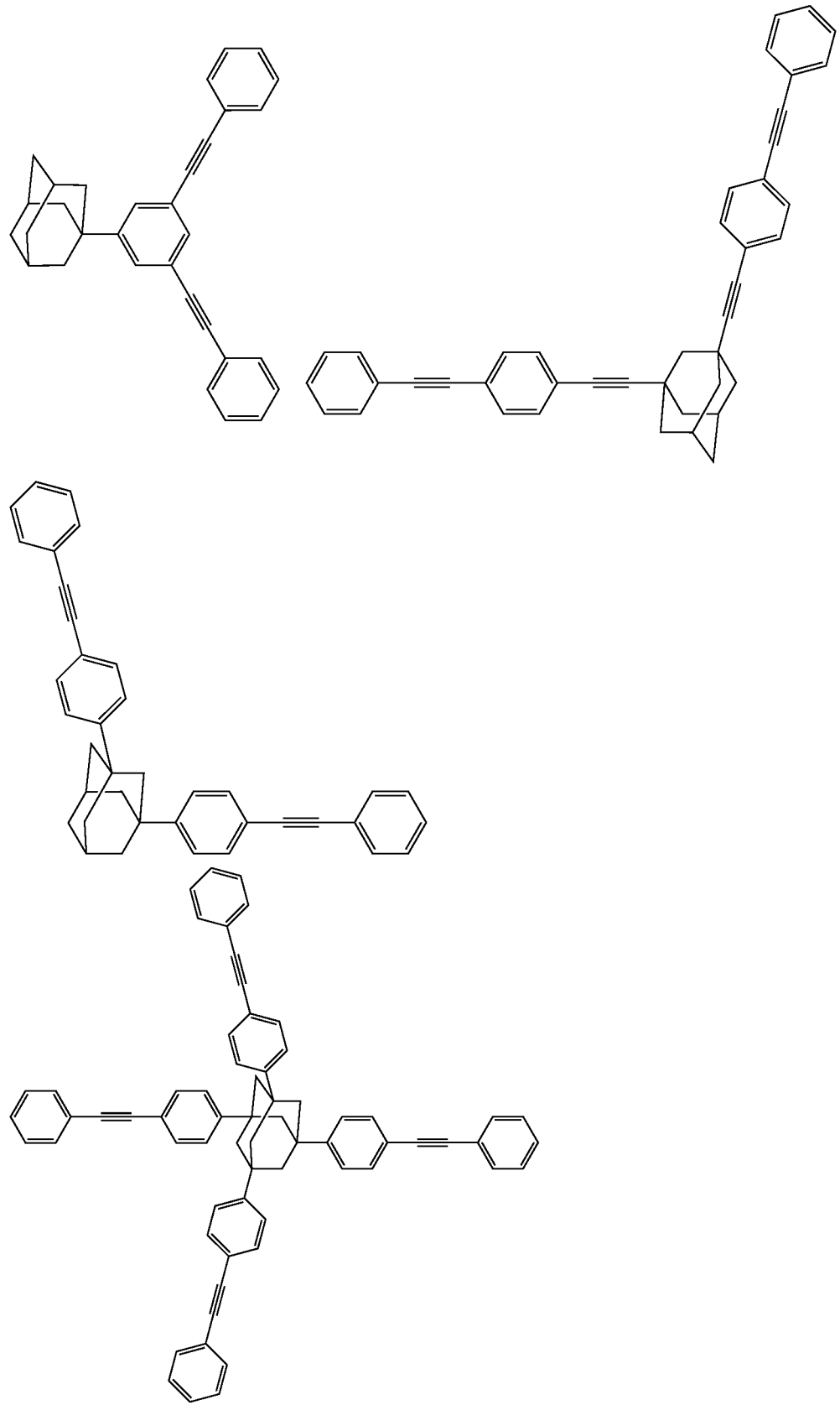

-continued
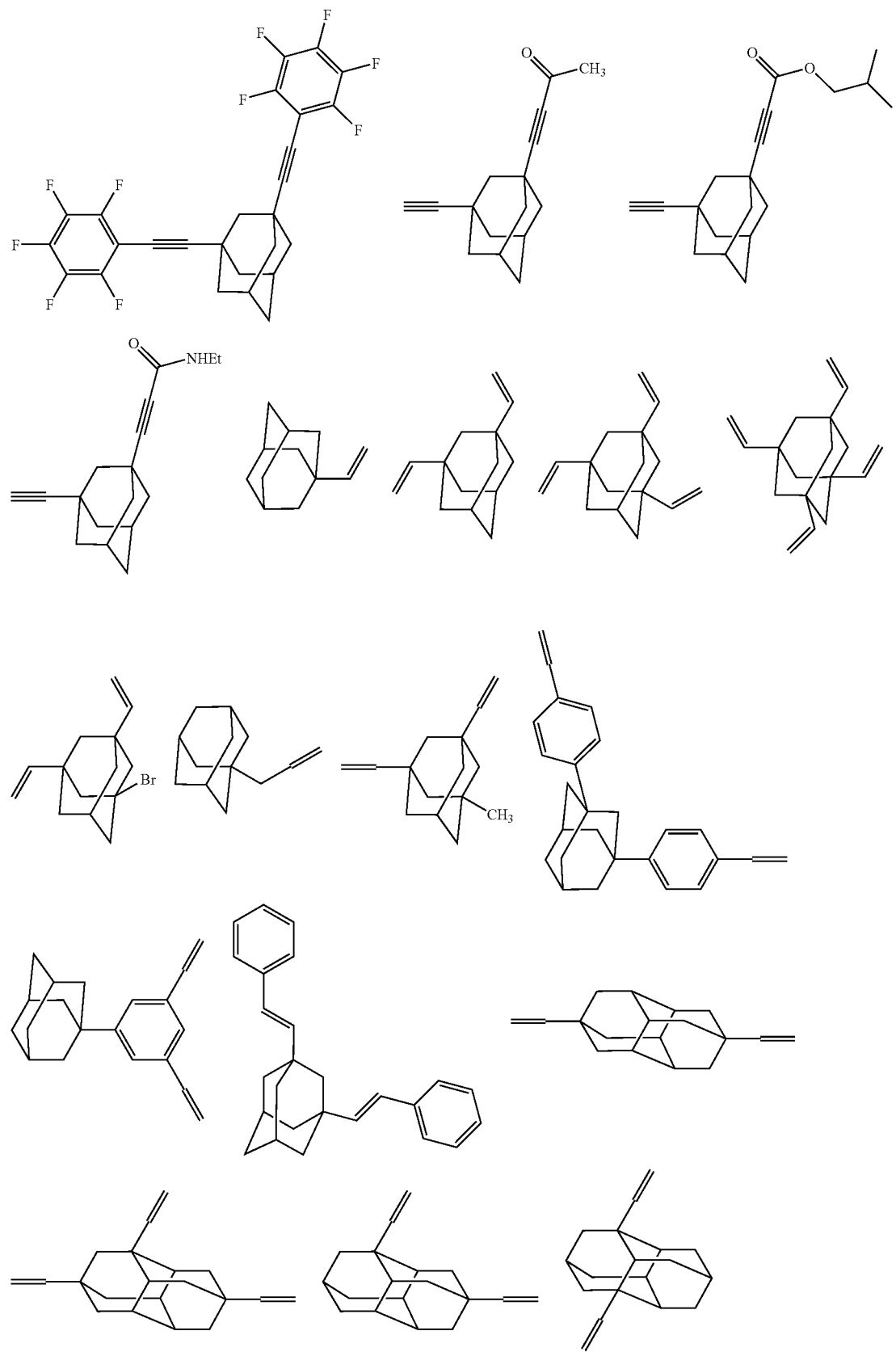

-continued

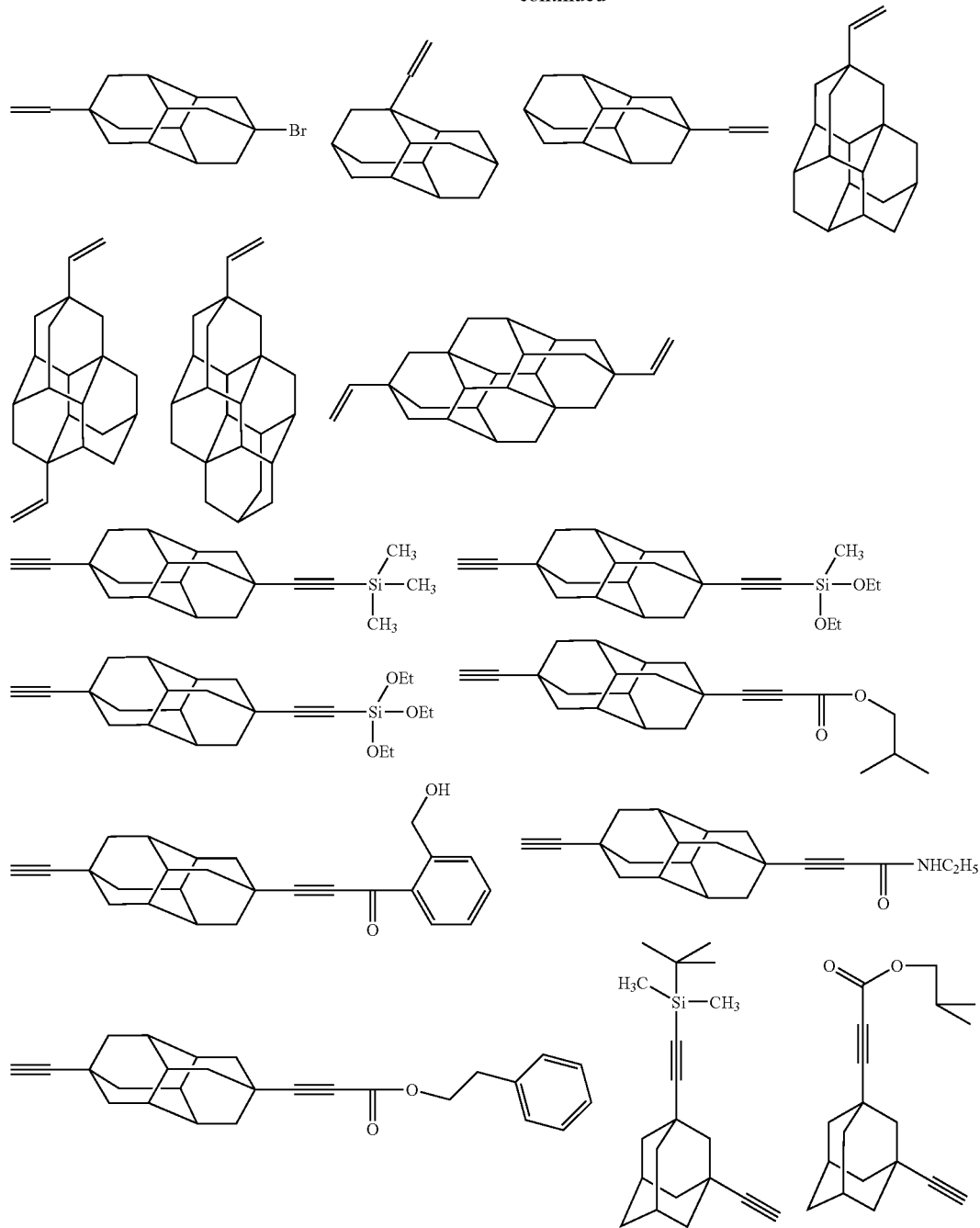

For the polymerization reaction, any solvent is usable so far as it can dissolve therein the raw material monomer at a required concentration and does not adversely affect the properties of the film formed from the polymer thus obtained. Examples of the solvent include water; alcohol solvents such as methanol, ethanol, and propanol; ketone solvents such as alcohol acetone, methyl ethyl ketone, methyl isobutyl ketone, cyclohexanone, and acetophenone; ester solvent such as ethyl acetate, butyl acetate, propylene glycol monomethyl ether acetate, γ-butyrolactone, and methyl benzoate; ether solvents such as dibutyl ether and anisole; aromatic hydrocarbon solvents such as toluene, xylene, mesitylene, 1,2,4-tetramethylbenzene, pentamethylbenzene, isopropylbenzene, 1,4-diisopropylbenzene, t-butylbenzene, 1,4-di-t-butylbenzene, 1,3,5-triethylbenzene, 1,3,5-tri-t-butylbenzene, 4-t-butyl-orthoxylene, 1-methylnaphthalene and 1,3,5-triisopropylbenzene; amide solvents such as N-methylpyrrolidin one and dimethylacetamide; halogen solvents such as carbon tetrachloride, dichloromethane, chloroform, 1,2-dichloroethane, chlorobenzene, 1,2-dichlorobenzene, and 1,2,4-trichlorobenzene; and aliphatic hydrocarbon solvents such as hexane, heptane, octane and cyclohexane. Of these solvents, preferred are acetone, methyl ethyl ketone, methyl isobutyl ketone, cyclohexanone, acetophenone, ethyl acetate, propylene glycol monoethyl ether acetate, γ-butyrolactone, anisole, tetrahydrofuran, toluene, xylene, mesitylene, 1,2,4,5-tetramethylbenzene, isopropylbenzene, t-butylbenzene, 1,4-di-t-butylbenzene, 1,3,5-tri-t-butylbenzene, 4-t-butyl-orthoxylene, 1-methylnaphthalene, 1,3,5-triisopropylbenzene, 1,2-dichloroethane, chlorobenzene, 1,2-dichlorobenzene, and 1,2,4-trichlorobenzene, of which tetra hydrofuran, γ-butyrolactone, anisole, toluene, xylene, mesitylene, isopropylbenzene, t-butylbenzene, 1,3,5-tri-butylbenzene, 1-methylnaphthalene, 1,3,5-triisopropylbenzene, 1,2-dichloroethane, chlorobenzene, 1,2-dichlorobenzene, and 1,2,4-trichlorobenzene are more preferred, with γ-butyrolactone, anisole, mesitylene, t-butylbenzene, 1,3,5-triisopropylbenzene, 1,2-dichlorobenzene, and 1,2,4-trichlorobenzene being especially preferred. These solvents may be used either singly or as a mixture.

The monomer concentration in the reaction mixture is preferably from 1 to 50 wt. %, more preferably from 5 to 30 wt. %, especially preferably from 10 to 20 wt. %

The optimum conditions of the polymerization reaction in the invention differ, depending on the kind, concentration or the like of the polymerization initiator, monomer or solvent. The polymerization reaction is effected at a bulk temperature of preferably from 0 to 200° C., more preferably from 50 to 170° C., especially preferably from 100 to 150° C. for a polymerization time of preferably from 1 to 50 hours, more preferably from 2 to 20 hours, especially preferably from 3 to 10 hours.

The reaction is conducted preferably in an inert gas atmosphere (for example, nitrogen or argon) in order to suppress the inactivation of the polymerization initiator which will otherwise occur by oxygen. The oxygen concentration during the reaction is preferably 100 ppm or less, more preferably 50 ppm or less, especially preferably 20 ppm or less.

The monomer having the cage structure (a) in the invention can be synthesized, for example, by using commercially available diamantane as a raw material, reacting it with bromine in the presence or absence of an aluminum bromide catalyst to introduce a bromine atom into the desired position of diamantane, causing a Friedel-Crafts reaction between the resulting compound with vinyl bromide in the presence of a Lewis acid such as aluminum bromide, aluminum chloride, or iron chloride to introduce a 2,2-dibromoethyl group, and then converting it into an ethynyl group by the HBr elimination by using a strong base. More specifically, it can be synthesized in accordance with the process described in *Macromolecules.*, 24, 5266-5268 (1991) or 28, 5554-5560 (1995), *Journal of Organic Chemistry.*, 39, 2995-3003 (1974) or the like.

An alkyl group or a silyl group may be introduced by making the hydrogen atom of the terminal acetylene group anionic with butyl lithium or the like and then reacting the resulting compound with an alkyl halide or silyl halide.

The high molecular weight compound (A) to be incorporated in the insulating film forming composition in the invention embraces a high molecular weight compound obtained by polymerizing a cage-type silsesquioxane compound having two or more unsaturated groups as a substituent.

The cage-type silsesquioxane compound having two or more unsaturated groups as a substituent may be a polymer of a monomer containing a cage structure formed by mutual linking between m pieces of $RSi(O_{0.5})_3$ units (wherein m stands for an integer from 8 to 16 and R's each independently represents a non-hydroyzale group, with the proviso that at least two of R's each represents a vinyl- or ethynyl-containing group) with another $RSi(O_{0.5})_3$ unit while sharing the oxygen atom in common (such a cage structure will herein after be called "cage structure (b)").

In the above unit, R's each represents a non-hydrolyzable group.

The term "non-hydrolyzable group" as used herein means a group whose remaining ratio is 95% or greater when the group is brought into contact with one equivalent of neutral water at room temperature for one hour.

At least two of R's are vinyl- or ethyl-containing groups. Examples of the non-hydrolyzable group as R include alkyl groups (such as methyl, t-butyl, cyclopentyl, and cyclohexyl), aryl groups (such as phenyl, 1-naphthyl, and 2-naphthyl), a vinyl group, an ethynyl group, and an allyl group.

At least two of R's are vinyl- or ethynyl-containing groups, but it is preferred that at least two of R's are vinyl groups. When the group represented by R is a vinyl- or ethynyl-containing group, the vinyl or ethynyl group is preferably bonded, directly or via a divalent linking group, to a silicon atom to which R is bonded. Examples of the divalent linking group include $-[C(R^{11})(R^{12})]_k-$ (in which $R^{11}$ and $R^{12}$ each independently represents a hydrogen atom, a methyl group, or an ethyl group and k stands for an integer from 1 to 6), $-CO-$, $-O-$, $-N(R^{13})-$ (in which $R^{13}$ represents a hydrogen atom, a methyl group, or an ethyl group), $-S-$, and divalent linking groups obtained using the above-described groups in any combination. Of these, $-[C(R^{11})(R^{12})]_k-$, $-O-$, and divalent linking groups obtained using these groups in any combination are preferred. In the cage structure (b), the vinyl or ethynyl group is preferably directly bonded to a silicon atom to which R is bonded.

It is more preferred that at least two vinyl groups of R's are directly bonded to a silicon atom to which R is bonded. It is especially preferred that R's are all vinyl groups.

As the cage structure (b), structures represented by any of the following formulas (Q-1) to (Q-6) are preferred.

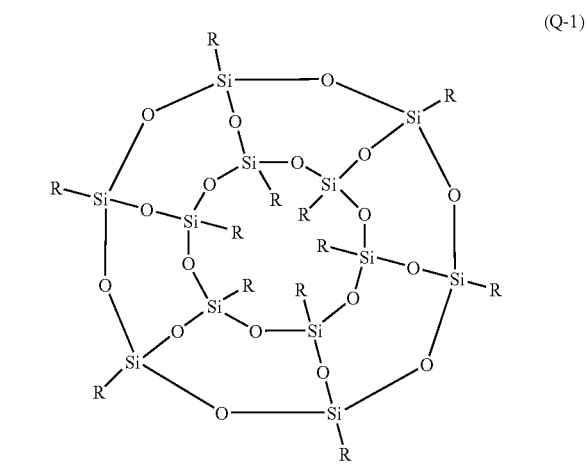

(Q-1)

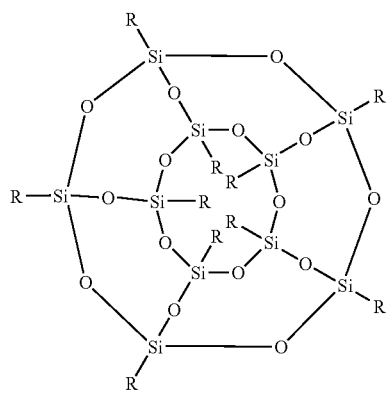
(Q-2)
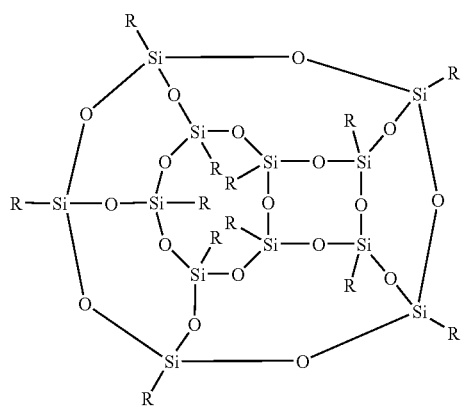
(Q-3)
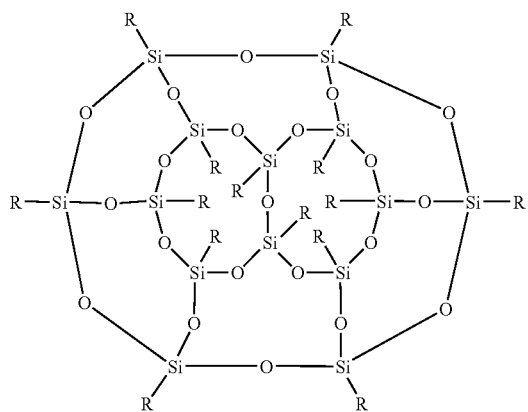
(Q-4)
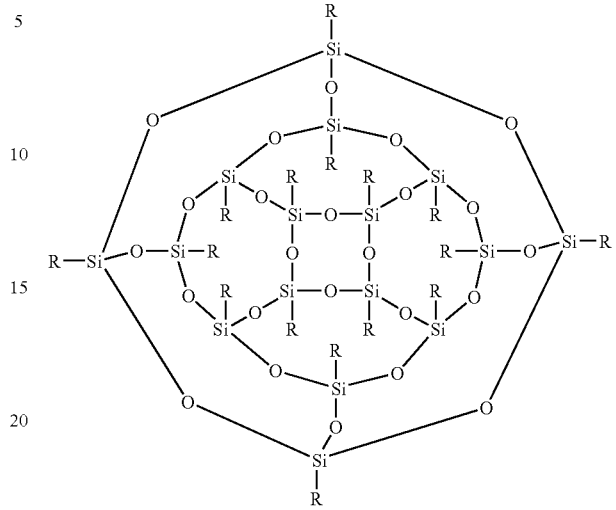
(Q-5)
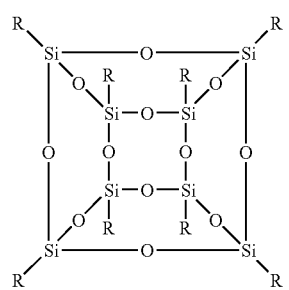
(Q-6)
In the above formulas (Q-1) to (Q-6), R represents a non-hydrolyzable group with the proviso that at least two of R's represent a vinyl- or ethynyl-containing group.
Specific examples of R are similar to those described above.
Specific examples of the cage structure (b) include, but not limited to, following ones.
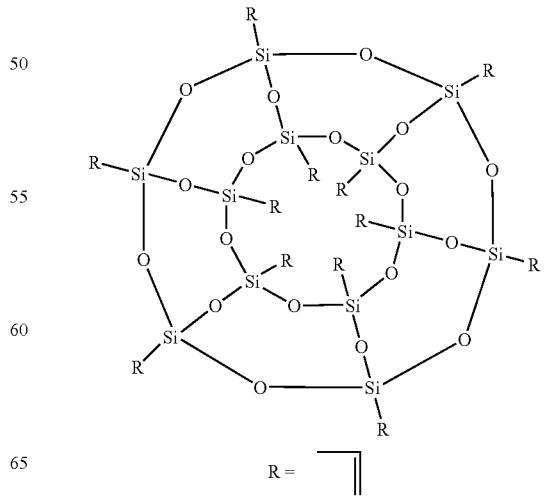
(I-a)
R = 

-continued
(I-b)
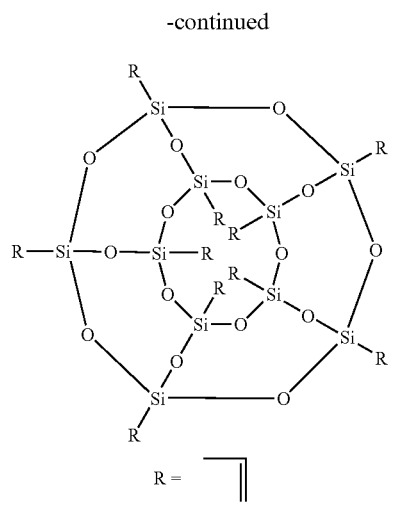
R =
(I-c)
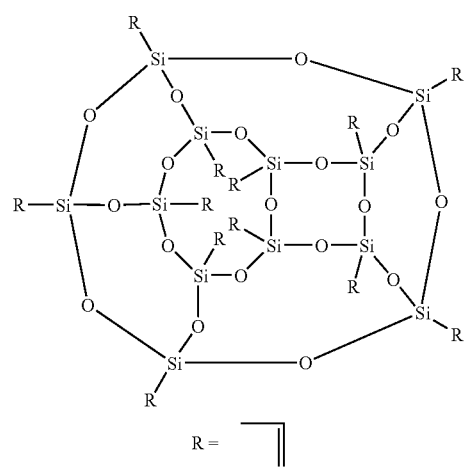
R =
(I-d)
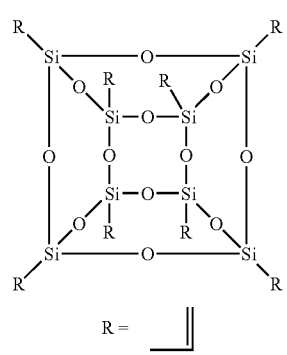
R =
-continued
(I-e)
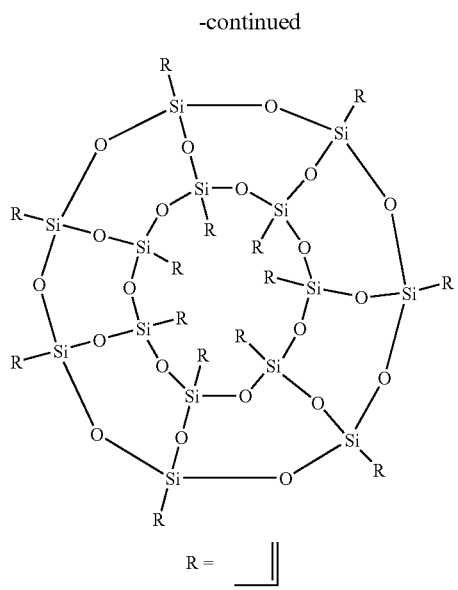
R =
(I-f)
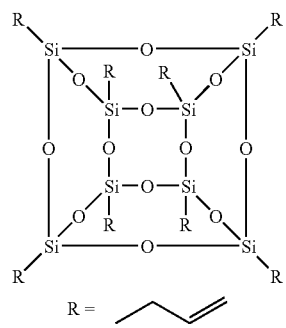
R =
(I-g)
R =

-continued

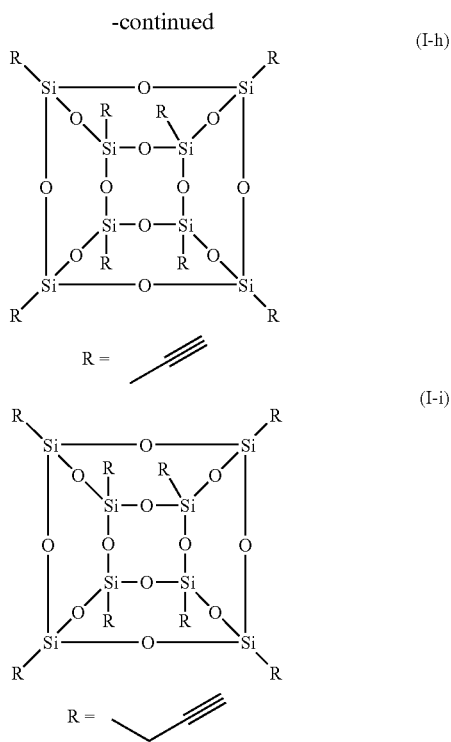

The cage structure (b) may be a commercially available one or may be synthesized in a known manner.

The composition of the invention may contain a polymerization product having a plurality of the cage structures (b) different from each other. In this case, it may be a copolymer composed of a plurality of the cage structures (b) different from each other or a mixture of homopolymers. When the composition of the invention is a copolymer composed of a plurality of the cage structures (b) different from each other, it is preferably a copolymer of a mixture of two or more cage structures (b) selected from those wherein m=8, m=10, and m=12.

Alternatively, a copolymer composed of the cage structure (b) and another monomer is usable as the high molecule compound (A). As the another monomer, compounds having a plurality of polymerizable carbon-carbon unsaturated bonds are preferred. Examples include vinylsilanes, vinylsiloxanes, phenylacetylenes, and the monomers represented by the above formulas (I) to (VI).

In order to synthesize a polymer composed of the monomer containing the cage structure (b), it is preferred to dissolve the monomer in a solvent and adding a polymerization initiator to the resulting solution to react a vinyl group or the like.

Although the polymerization reaction is not limited, examples include radical polymerization, cationic polymerization, anionic polymerization, ring-opening polymerization, polycondensation, polyaddition, addition condensation, and polymerization using a transition metal catalyst.

The polymerization reaction of the monomer containing the cage structure (b) is preferably carried out in the presence of a non-metallic polymerization initiator. For example, the monomer can be polymerized in the presence of a polymerization initiator which generates free radicals such as carbon radicals or oxygen radicals by heating, thereby showing activity.

As the polymerization initiator, organic peroxides and organic azo compounds are preferred, of which organic peroxides are especially preferred.

Preferred examples of the organic peroxides include ketone peroxides such as "PERHEXA H", peroxyketals such as "PERHEXA TMH", hydroperoxides such as "PERBUTYL H-69", dialkylperoxides such as "PERCUMYL D", "PERBUTYL C" and "PERBUTYL D", diacyl peroxides such as "NYPER BW", peroxy esters such as "PERBUTYL Z" and "PERBUTYL L", and peroxy dicarbonates such as "PEROYL TCP", (each, trade name; commercially available from NOF Corporation), and "Luperox 11" (trade name; commercially available from Arkema Yoshitomi.

Examples of the organic azo compound include azonitrile compounds such as "V-30", "V-40", "V-59", "V-60", "V-65" and "V-70", azoamide compounds such as "VA-080", "VA-085", "VA-086", "VF-096", "VAm-110" and "VAm-111", cyclic azoamidine compounds such as "VA-044" and "VA-061", and azoamidine compounds such as "V-50" and VA-057" (each, trade name; commercially available from Wako Pure Chemical Industries).

These polymerization initiators to be used for the polymerization reaction of the monomer containing the cage structure (b) may be used either singly or in combination.

Their using amount is preferably from 0.001 to 2 mols, more preferably from 0.01 to 1 mol, especially preferably from 0.05 to 0.5 mol, per mol of the monomer.

For the polymerization reaction of the monomer containing the cage structure (b), any solvent is usable so far as it can dissolve therein the monomer at a required concentration and does not adversely affect the properties of the film formed from the polymer thus obtained. Examples of the solvent include water; alcohol solvents such as methanol, ethanol, and propanol; ketone solvents such as acetone, methyl ethyl ketone, methyl isobutyl ketone, cyclohexanone, and acetophenone; ester solvent such as ethyl acetate, butyl acetate, propylene glycol monomethyl ether acetate, γ-butyrolactone, and methyl benzoate; ether solvents such as dibutyl ether, anisole, and tetra hydrofuran; aromatic hydrocarbon solvents such as toluene, xylene, mesitylene, 1,2,4,5-tetramethylbenzene, pentamethylbenzene, isopropylbenzene, 1,4-diisopropylbenzene, t-butylbenzene, 1,4-di-t-butylbenzene, 1,3,5-triethylbenzene, 1,3,5-tri-t-butylbenzene, 4-t-butyl-orthoxylene, 1-methylnaphthalene, and 1,3,5-triisopropylbenzene; amide solvents such as N-methylpyrrolidin one and dimethylacetamide; halogen solvents such as carbon tetrachloride, dichloromethane, chloroform, 1,2-dichloroethane, chlorobenzene, 1,2-dichlorobenzene, and 1,2,4-trichlorobenzene; and aliphatic hydrocarbon solvents such as hexane, heptane, octane, and cyclohexane. Of these solvents, preferred are acetone, methyl ethyl ketone, methyl isobutyl ketone, cyclohexanone, acetophenone, ethyl acetate, butyl acetate, propylene glycol monoethyl ether acetate, γ-butyrolactone, anisole, tetra hydrofuran, toluene, xylene, mesitylene, 1,2,4,5-tetramethylbenzene, isopropylbenzene, t-butylbenzene, 1,4-di-t-butylbenzene, 1,3,5-tri-butylbenzene, 4-t-butyl-orthoxylene, 1-methylnaphthalene, 1,3,5-triisopropylbenzene, 1,2-dichloroethane, chlorobenzene, 1,2-dichlorobenzene, and 1,2,4-trichlorobenzene, of which tetra hydrofuran, γ-butyrolactone, anisole, toluene, xylene, mesitylene, isopropylbenzene, t-butylbenzene, 1,3,5-tri-butylbenzene, 1-methylnaphthalene, 1,3,5-triisopropylbenzene, 1,2-dichloroethane, chlorobenzene, 1,2-dichlorobenzene, and 1,2,4-trichlorobenzene are preferred and γ-butyrolactone, anisole, mesitylene, t-butylbenzene, 1,3,5-triisopropylbenzene, 1,2-dichlorobenzene, and 1,2,4-trichlorobenzene are especially preferred. These solvents may be used either singly or as a mixture.

The monomer concentration in the reaction mixture is preferably 30 mass % or less, more preferably 10 mass % or less, more preferably 5 mass % or less, still more preferably 1 mass % or less, most preferably 0.5 mass % or less. Lower concentrations of the monomer at the time of polymerization enables synthesis of a composition having a larger weight-average molecular weight and a larger number-average molecular weight and soluble in an organic solvent.

The optimum conditions of the polymerization reaction in the invention differ, depending on the kind, concentration or the like of the polymerization initiator, monomer or solvent. The polymerization reaction is effected at a bulk temperature preferably from 0 to 200° C., more preferably from 40 to 170° C., especially preferably from 70 to 150° C. for a polymerization time preferably from 1 to 50 hours, more preferably from 2 to 20 hours, especially preferably from 3 to 10 hours.

The reaction is conducted preferably in an inert gas atmosphere (for example, nitrogen or argon) in order to suppress the inactivation of the polymerization initiator which will otherwise occur by oxygen. The oxygen concentration during the reaction is preferably 100 ppm or less, more preferably 50 ppm or less, especially preferably 20 ppm or less.

The mass average molecular weight (Mw) of the polymer obtained by polymerization is preferably from 1000 to 1000000, more preferably from 2000 to 500000 and especially preferably from 3000 to 100000.

The polymer composed of the monomer having the cage structure (b) is preferably soluble in an organic solvent. The term "soluble in an organic solvent" defines that 5 mass % or greater of the polymer dissolves at 25° C. in a solvent selected from cyclohexanone, methyl ethyl ketone, methyl isobutyl ketone, propylene glycol monomethyl ether acetate, propylene glycol monomethyl ether, and γ-butyrolactone. Preferably, 10 mass % or greater of the polymer, more preferably 20 mass % or greater of the polymer dissolves in the solvent.

The dispersity (Mw/Mn) of the polymer composed of the monomer having the cage structure (b) as calculated from a GPC chart is preferably from 1 to 15, more preferably from 1 to 10, most preferably from 1 to 5. Supposing that two polymers have the same Mw, the polymer having a smaller dispersity is suited for forming a film having a low density, refractive index and dielectric constant.

Examples of a method for producing a composition having the above-described physical properties include a method of, at the time of polymerizing the monomer having the cage structure (b), adopting high dilution conditions, adding a chain transfer agent, optimizing a reaction solvent, successively adding a polymerization initiator, successively adding the monomer, and adding a radical trapping agent.

It is also possible to employ, after polymerization of the monomer having the cage structure (b), a method such as removal of insoluble matters by filtration, purification by column chromatography, purification by re-precipitation treatment.

The term "re-precipitation treatment" as used herein means collection of the composition of the invention by filtration after it is precipitated by adding a poor solvent (a solvent which does not substantially dissolve the composition of the invention therein) to the reaction mixture from which the reaction solvent has been distilled off as needed or adding dropwise the reaction mixture from which the reaction solvent has been distilled off as needed to a poor solvent.

The poor solvent is preferably an alcohol (such as methanol, ethanol, or isopropyl alcohol). The poor solvent is added in an amount of from equal mass to 200 times the mass, more preferably from 2 to 50 times the mass of the composition of the invention.

When the high molecular weight compound composed of the monomer having the cage structure (b) is used, it is preferred to distill off the reaction solvent used for the polymerization and thereby use the high molecular weight compound in the concentrated form. In addition, the high molecular weight compound is preferably used after re-precipitation treatment.

The polymer is concentrated preferably by heating the reaction mixture and/or reducing the pressure of the reaction mixture in a rotary evaporator, distiller or a reaction apparatus used for the polymerization reaction. The temperature of the reaction mixture at the time of concentration is usually from 0 to 180° C., preferably from 10 to 140° C., more preferably from 20 to 100° C., most preferably from 30 to 60° C. The pressure at the time of concentration is usually from 0.001 to 760 torr, preferably from 0.01 to 100 torr, more preferably from 0.01 to 10 torr.

When the reaction mixture is concentrated, it is concentrated until the solid content in the reaction mixture reaches preferably 10 mass % or greater, more preferably 30 mass % or greater, most preferably 50 mass % or greater.

For the insulating film forming composition of the invention, the high molecular weight compounds as described above may be used either singly or as a mixture.

(B) Coating Solvent

Although no particular limitation is imposed on the coating solvent to be used for the insulating film forming composition of the invention, examples include alcohol solvents such as methanol, ethanol, 2-propanol, 1-butanol, 2-ethoxymethanol, 3-methoxypropanol, and 1-methoxy-2-propanol; ketone solvents such as acetone, acetylacetone, methyl ethyl ketone, methyl isobutyl ketone, 2-pentanone, 3-pentanone, 2-heptanone, 3-heptanone, cyclopentanone, and cyclohexanone; ester solvents such as ethyl acetate, propyl acetate, butyl acetate, isobutyl acetate, pentyl acetate, ethyl propionate, propyl propionate, butyl propionate, isobutyl propionate, propylene glycol monomethyl ether acetate, methyl lactate, ethyl lactate and γ-butyrolactone; ether solvents such as diisopropyl ether, dibutyl ether, ethyl propyl ether, anisole, phenetole, and veratrole; aromatic hydrocarbon solvents such as mesitylene, ethylbenzene, diethylbenzene, propylbenzene, and t-butylbenzene; and amide solvents such as N-methylpyrrolidinone and dimethylacetamide. These solvents may be used either singly or in combination.

Of these, more preferred are 1-methoxy-2-propanol, propanol, acetylacetone, cyclohexanone, propylene glycol monomethyl ether acetate, butyl acetate, methyl lactate, ethyl lactate, γ-butyrolactone, anisole, mesitylene, and t-butylbenzene, with 1-methoxy-2-propanol, cyclohexanone, propylene glycol monomethyl ether acetate, ethyl lactate, γ-butyrolactone, t-butylbenzene and anisole being especially preferred.

(D) Surfactant

A surfactant (D) can be incorporated as needed in the insulating film forming composition of the invention in order to adjust uniformity of film thickness of a coated film. Examples of the surfactant (D) which can be incorporated in the composition include nonionic surfactants, anionic surfactants, and cationic surfactants. Further examples include silicone surfactants, fluorosurfactants, polyalkylene oxide surfactants, and acrylic surfactants. In the invention, these surfactants can be used either singly or in combination. As the surfactant, silicone surfactants, nonionic surfactants, fluorosurfactants, and acrylic surfactants are preferred, with silicone surfactants being especially preferred.

The amount of the surfactant to be used in the invention is preferably from 0.01 mass % or greater but not greater than 1 mass %, more preferably 0.1 mass % or greater but not greater than 0.5 mass %, each based on the total amount of the film forming coating solution.

The term "silicone surfactant" as used herein means a surfactant containing at least one Si atom. Any silicone surfactant may be used in the invention, but it preferably contains a structure containing an alkylene oxide and dimethylsiloxane, of which a silicone surfactant having a structure containing the following chemical formula is more preferred.

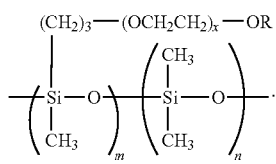

In the above formula, R represents a hydrogen atom or a $C_{1-5}$ alkyl group, x stands for an integer from 1 to 20, and m and n each independently represents an integer of from 2 to 100. A plurality of R's may be the same or different.

Examples of the silicone surfactant to be used in the invention include "BYK 306" and "BYK 307" (each, trade name; product of BYK Chemie), "SH7PA", "SH21PA", "SH28PA", and "SH30PA" (each, trade name; product of Dow Corning Toray Silicone), and Troysol S366 (trade name; product of Troy Chemical).

As the nonionic surfactant to be used in the invention, any nonionic surfactant is usable. Examples include polyoxyethylene alkyl ethers, polyoxyethylene aryl ethers, polyoxyethylene dialkyl esters, sorbitan fatty acid esters, fatty-acid-modified polyoxyethylenes, and polyoxyethylene-polyoxypropylene block copolymers.

As the fluorosurfactant to be used in the invention, any fluorosurfactant is usable. Examples include perfluorooctyl polyethylene oxide, perfluorodecyl polyethylene oxide, and perfluorododecyl polyethylene oxide.

As the acrylic surfactant to be used in the invention, any acrylic surfactant is usable. Examples include (meth)acrylic acid copolymer.

(E) Other Physical Property Regulators of Insulating Film

To the insulating film forming composition of the invention, additives such as radical generator, colloidal silica, silane coupling agent, adhesion accelerator, and pore forming agent may be added in an amount so as not to impair the physical properties (such as heat resistance, dielectric constant, mechanical strength, coatability and adhesion) of the resulting insulating film.

Any colloidal silica may be used in the invention. For example, a dispersion obtained by dispersing high purity silicic anhydride in a hydrophilic solvent or water can be used. It usually has an average particle size of from 5 to 30 nm, preferably from 10 to 20 nm and has a solid concentration of from about 5 to 40 weight %.

Any silane coupling agent may be used in the invention. Examples include 3-glycidyloxypropyltrimethoxysilane, 3-aminoglycidyloxypropyltriethoxysilane, 3-methacryloxypropyltrimethoxysilane, 3-glycidyloxypropylmethyldimethoxysilane, 1-methacryloxypropylmethyldimethoxysilane, 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropylmethyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylenetriamine, N-triethoxysilylpropyltriethylenetriamine, 10-trimethoxysilyl-1,4,7-triazadecane, 10-triethoxysilyl-1,4,7-triazadecane, 9-trimethoxysilyl-3,6-diazanonyl acetate, 9-triethoxysilyl-3,6-diazanonyl acetate, N-benzyl-3-aminopropyltrimethoxysilane, N-benzyl-3-aminopropyltriethoxysilane, N-phenyl-3-aminopropyltrimethoxysilane, N-phenyl-3-aminopropyltriethoxysilane, N-bis(oxyethylene)-3-aminopropyltrimethoxysilane, and N-bis(oxyethylene)-3-aminopropyltriethoxysilane. Those silane coupling agents may be used either singly or in combination.

In the invention, any adhesion accelerator may be used. Examples include trimethoxysilylbenzoic acid, γ-methacryloxypropyltrimethoxysilane, vinyltriacetoxysilane, vinyltrimethoxysilane, γ-isocyanatopropyltriethoxysilane, γ-glycidoxypropyltrimethoxysilane, β-(3,4-epoxycyclohexyl)ethyltrimethoxysilane, trimethoxyvinylsilane, γ-aminopropyltriethoxysilane, aluminum monoethylacetoacetate disopropylate, vinyltris(2-methoxyethoxy)silane, N-(2-aminoethyl)-3-aminopropylmethyldimethoxysilane, N-(2-aminoethyl)-3-aminopropyltrimethoxysilane, 3-chloropropylmethyldimethoxysilane, 3-chloropropyltrimethoxysilane, 3-methacryloxypropyltrimethoxysilane, 3-mercaptopropyltrimethoxysilane, trimethylchlorosilane, dimethylvinylchlorosilane, methyldiphenylchlorosilane, chloromethyldimethylchlorosilane, trimethylmethoxysilane, dimethyldiethoxysilane, methyldimethoxysilane, dimethylvinylethoxysilane, diphenyldimethoxysilane, phenyltriethoxysilane, hexamethyldisilazane, N,N'-bis(trimethylsilyl)urea, dimethyltrimethylsilylamine, trimethylsilylimidazole, vinyltrichlorosilane, benzotriazole, benzimidazole, indazole, imidazole, 2-mercapto benzimidazole, 2-mercapto benzothiazole, 2-mercapto benzoxazole, urazole, thiourasil, mercaptoimidazole, mercaptopyrimidine, 1,1-dimethylurea, 1,3-dimethylurea, and thiourea compounds. A functional silane coupling agent is preferred as an adhesion accelerator. The amount of the adhesion accelerator is preferably 10 parts by weight or less, especially preferably from 0.05 to 5 parts by weight, based on 100 parts by weight of the total solid content.

It is also possible to make porous the film available from the insulating film forming composition of the invention by incorporating therein a pore forming factor to an extent allowed by the mechanical strength of the film and thereby reducing the dielectric constant of the film.

Although no particular limitation is imposed on the pore forming factor as an additive serving as a pore forming agent, a non-metallic compound is preferred. The pore forming agent must satisfy both the solubility in a solvent to be used for a film forming coating solution and compatibility with the polymer of the invention. The boiling temperature or decomposition temperature of the pore forming agent is preferably from 100 to 500° C., more preferably from 200 to 450° C., especially preferably from 250 to 400° C. The molecular weight of it is preferably from 200 to 50000, more preferably from 300 to 10000, especially preferably from 400 to 5000. The amount of it is, in terms of mass % relative to the polymer for forming the film, preferably from 0.5 to 75%, more preferably from 0.5 to 30%, especially preferably from 1 to 20%. The polymer may contain a decomposable group as the pore forming factor. The decomposition temperature of it is preferably from 100 to 500° C., more preferably from 200 to 450° C., especially preferably from 250 to 400° C. The content of the decomposable group is, in terms of mole % relative to the polymer for forming the film, from 0.5 to 75%, more preferably from 0.5 to 30%, especially preferably from 1 to 20%.

The total solid concentration in the insulating film forming composition of the invention is preferably from 0.1 to 50 mass %, more preferably from 0.5 to 15 mass %, especially preferably from 1 to 10 mass %.

The content of metals, as an impurity, of the insulating film forming composition of the invention is preferably as small as possible. The metal content of the insulating film forming composition can be measured with high sensitivity by the ICP-MS and in this case, the content of metals other than transition metals is preferably 30 ppm or less, more preferably 3 ppm or less, especially preferably 300 ppb or less. The content of the transition metal is preferably as small as possible because it accelerates oxidation by its high catalytic capacity and the oxidation reaction in the prebaking or thermosetting process decreases the dielectric constant of the film obtained by the invention. Its content is preferably 10 ppm or less, more preferably 1 ppm or less, especially preferably 100 ppb or less.

The metal concentration of the insulating film forming composition can also be evaluated by subjecting a film obtained using the insulating film forming composition of the invention to total reflection fluorescent X-ray analysis. When W ray is employed as an X-ray source, K, Ca, Ti, Cr, Mn, Fe, Co, Ni, Cu, Zn, and Pd can be measured as metal elements. The concentrations of them are each preferably from $100 \times 10^{10}$ $cm^{-2}$ or less, more preferably $50 \times 10^{10}$ $cm^{-2}$ or less, especially preferably $10 \times 10^{10}$ $cm^{-2}$ or less. In addition, the concentration of Br as a halogen can be measured. Its remaining amount is preferably $10000 \times 10^{10}$ $cm^{-2}$ or less, more preferably $1000 \times 10^{10}$ $cm^{-2}$, especially preferably $400 \times 10^{10}$ $cm^{-2}$. Moreover, the concentration of Cl can also be observed as a halogen. In order to prevent it from damaging a CVD device, etching device or the like, its remaining amount is preferably $50 \times 10^{10}$ $cm^{-2}$ or less, more preferably $50 \times 10^{10}$ $cm^{-2}$ or less, especially preferably $10 \times 10^{10}$ $cm^{-2}$ or less.

The film can be formed by applying the insulating film forming composition of the invention onto a substrate by a desired method such as spin coating, roller coating, dip coating, or scan coating, and then heating the resulting substrate to remove the solvent therefrom. As the method of applying the composition to the substrate, spin coating and scan coating are preferred, with spin coating being especially preferred. For spin coating, commercially available apparatuses such as "Clean Track Series" (product of Tokyo Electron), "D-spin Series" (product of Dainippon Screen), or "SS series" or "CS series" (each, product of Tokyo Oka Kogyo) are preferably employed. The spin coating may be performed at any rotation speed, but from the viewpoint of in-plane uniformity of the film, a rotation speed of about 1300 rpm is preferred for a 300-mm silicon substrate.

When the solution of the composition is discharged, either dynamic discharge in which the solution is discharged onto a rotating substrate or static discharge in which the solution is discharged onto a static substrate may be employed. The dynamic discharge is however preferred in view of the in-plane uniformity of the film. Alternatively, from the viewpoint of reducing the consumption amount of the composition, a method of discharging only a main solvent of the composition to a substrate in advance to form a liquid film and then discharging the composition thereon can be employed. Although no particular limitation is imposed on the spin coating time, it is preferably within 180 seconds from the viewpoint of throughput. From the viewpoint of the transport of the substrate, it is preferred to subject the substrate to processing (such as edge rinse or back rinse) for preventing the film from remaining at the edge portion of the substrate.

The heat treatment method is not particularly limited, but ordinarily employed methods such as hot plate heating, heating with a furnace, heating in an RTP (Rapid Thermal Processor) to expose the substrate to light of, for example, a xenon lamp can be employed. Of these, hot plate heating or heating with a furnace is preferred. As the hot plate, a commercially available one, for example, "Clean Track Series" (trade name; product of Tokyo Electron), "D-spin Series" (trade name; product of Dainippon Screen), and "SS series" or "CS series" (trade name; product of Tokyo Oka Kogyo) is preferred, while as the furnace, "a series" (trade name; product of Tokyo Electron) is preferred.

It is especially preferred to cure the high molecular weight compound (A) contained in the insulating film forming composition of the invention by heating after application onto a substrate. For this purpose, the polymerization reaction of a carbon triple bond or double bond remaining in the high molecular weight compound (A) at the time of post heating may be utilized. The post heat treatment is performed preferably at from 100 to 450° C., more preferably at from 200 to 420° C., especially preferably at from 350 to 400° C., preferably for from 1 minute to 2 hours, more preferably for from 10 minutes to 1.5 hours, especially preferably for from 30 minutes to 1 hour. The post heat treatment may be performed in several times. This post heat treatment is performed especially preferably in a nitrogen atmosphere in order to prevent thermal oxidation due to oxygen.

In the invention, curing may be performed by causing polymerization reaction of a carbon triple bond or double bond remaining in the polymer not by heat treatment but by exposure to high energy radiation. Examples of the high energy radiation include electron beam, ultraviolet ray, and X ray. The curing method is not particularly limited to these methods.

When electron beam is employed as high energy radiation, the energy is preferably from 0 to 50 keV, more preferably from 0 to 30 keV, especially preferably from 0 to 20 keV. Total dose of electron beam is preferably from 0 to 5 µC/cm², more preferably from 0 to 2 µC/cm², especially preferably from 0 to 1 µC/cm². The substrate temperature when it is exposed to electron beam is preferably from 0 to 450° C., more preferably from 0 to 400° C., especially preferably from 0 to 350° C.

Pressure is preferably from 0 to 133 kPa, more preferably from 0 to 60 kPa, especially preferably from 0 to 20 kPa.

The atmosphere around the substrate is preferably an atmosphere of an inert gas such as Ar, He or nitrogen from the viewpoint of preventing oxidation of the polymerization product of the invention. An oxygen, hydrocarbon or ammonia gas may be added for the purpose of causing reaction with plasma, electromagnetic wave or chemical species which is generated by the interaction with electron beam. In the invention, exposure to electron beam may be carried out in plural times. In this case, the exposure to electron beam is not necessarily carried out under the same conditions but the conditions may be changed every time.

Ultraviolet ray may be employed as high energy radiation. The radiation wavelength range of the ultraviolet ray is preferably from 160 to 400 nm, while its output immediately above the substrate is preferably from 0.1 to 2000 mWcm$^{-2}$. The substrate temperature upon exposure to ultraviolet ray is preferably from 250 to 450° C., more preferably from 250 to 400° C., especially preferably from 250 to 350° C. The atmosphere around the substrate is preferably an atmosphere of an inert gas such as Ar, He or nitrogen from the viewpoint of preventing oxidation of the polymerization product of the invention. The pressure at this time is preferably from 0 to 133 kPa.

When the film formed from the insulating film forming composition of the invention is used as an inter layer insulating film for semiconductor, a barrier layer for preventing metal migration may be disposed on the side surface of an interconnect. In addition, a cap layer, an inter layer adhesion layer, or an etching stopper layer may be disposed on the upper or bottom surface of the interconnect or inter layer insulating film to prevent exfoliation at the time of CMP (Chemical Mechanical Polishing). Moreover, the inter layer insulating film may be composed of plural layers using another material as needed.

The film obtained using the insulating film forming composition of the invention can be etched for copper interconnection or another purpose. Either wet etching or dry etching may be employed, but dry etching is preferred. For dry etching, either ammonia plasma or fluorocarbon plasma may be used as needed. For the plasma, not only Ar but also a gas such as oxygen, nitrogen, hydrogen, or helium can be used. Etching may be followed by ashing for the purpose of removing a photoresist or the like used for etching. Moreover, the ashing residue may be removed by washing.

The film obtained using the insulating film forming composition of the invention may be subjected to CMP (Chemical Mechanical Polishing) for planarizing a copper plated portion after copper metallization. As a CMP slurry (chemical solution), a commercially available one (for example, product of Fujimi Incorporated, Rodel Nitta, JSR, or Hitachi Chemical) can be used as needed. As a CMP apparatus, a commercially available one (for example, product of Applied Material or Ebara Corporation) can be used as needed. After CMP, the film can be washed in order to remove the slurry residue.

The film available using the insulating film forming composition of the invention can be used for various purposes. For example, it is suited as an insulating film for semiconductor devices such as LSI, system LSI, DRAM, SDRAM, RDRAM, and D-RDRAM, and for electronic parts such as multi-chip module multilayered wiring boards. More specifically, it is usable as an inter layer insulating film, an etching stopper film, a surface protective film, or a buffer coat film for semiconductor and in addition, as a passivation film in LSI, an α-ray blocking film, a cover lay film in flexographic plates, an overcoat film, a cover coat for flexible copper-lined plates, a solder-resist film, or a liquid-crystal alignment film.

As another purpose, the film of the invention can be used as a conductive film by doping an electron donor or acceptor into the film, thereby imparting it with conductivity.

EXAMPLES

The present invention will next be described more specifically by Examples, but the scope of it is not limited by them.

Synthesis Example 1

In accordance with the synthesis process as described in *Macromolecules*, 5266 (1991), 4,9-diethynyldiamantane (a) was synthesized. Next, 2 g of 4,9-diethynyldiamantane (a), 0.22 g of dicumyl peroxide ("Percumyl D", trade name; product of NOF), and 10 ml of diphenyl ether were polymerized by stirring for 7 hours at a bulk temperature of 150° C. under a nitrogen gas stream. After cooling the reaction mixture to room temperature, 60 ml of isopropyl alcohol was added. A solid thus precipitated was collected by filtration and washed sufficiently with isopropyl alcohol to obtain a desired polymer of 4,9-diethynyldiamantane (a).

Synthesis Examples 2 to 7

In Synthesis Examples 2 to 7, in a similar manner to that employed in Synthesis Example 1 except for the use of 3,3, 3',3'-triethynyl-1,1'-biadamantane (b), 3,3'-diethynyl-1,1'-biadamantane (c), 1,6-diethynyldiamantane (d), 1,4,6,9-tetraethynyldiamantane (e), Exemplified Compound (I-a), and Exemplified Compound (I-d) instead of the monomer used in Synthesis Example 1, that is, 4,9-diethynyldiamantane (a), respectively, polymers were obtained.

Synthesis Example 8

3,3'-(Oxydi-1,4-phenylene)bis(2,4,5-triphenylcyclopentadienone) (Compound (f), 782.4 g, 1.0 mol) and 1,3,5-tris(phenylethynyl)benzene (Compound (g), 378.2 g (1.00 mol)) were dissolved in 4 liter of γ-butyrolactone and the resulting solution was added to a flask. After the flask was purged with nitrogen, the solution was stirred and heated to 200° C. After heating for 12 hours, the reaction mixture was cooled to room temperature and then added to 5 liter of ethanol. A powdery solid was then precipitated. It was a polymer as a Diels-Alder reaction product of Compound (f) and Compound (g).

Synthesis Example 9

4,4'-Diamino-3,3'-dihydroxydiphenyl ether (Compound (h), 23.2 g (0.1 mol)) and 3,3'-diamino-4,4'-dihydroxydiphenyl ether (Compound (i), 23.2 g, (0.1 mol)) were dissolved in 750 mL of N-methyl-2-pyrrolidone. To the resulting solution was added 5-ethynylterephthalic acid dichloride (Compound (j), 50.5 g (0.22 mol)) at 5° C. in a nitrogen atmosphere. After the addition, the resulting mixture was stirred at 10° C. for one hour and then at 20° C. for 2 hours. After the temperature of the reaction mixture was returned to 5° C., 50.6 g (0.5 mol) of triethylamine was added. Then, an γ-butyrolactone solution of both-hydroxy-terminated poly(ethylene glycol)-block-poly(propylene glycol)-block-poly(ethylene glycol) was added and a triethylamine hydrochloride was removed. The reaction mixture was purified to obtain a polybenzoxazole precursor polymer, that is, a polycondensation product of Compound (h), Compound (i), and Compound (j).

Examples 1 to 43, Comparative Example 1

Preparation of Insulating Film Forming Composition

In Examples 1 to 43, insulating film forming compositions were prepared by completely dissolving the polymers obtained in the above-described Synthesis Examples and organic silicone compounds (C) shown below in Table 1 so that a total solid content of the polymer (A) and the organic silicone compound (C) would be 3.0 mass % in the whole composition including the solvent. In Comparative Example 1, the composition is similar to that of Example 1 except that it does not contain the organic silicone compound (C).

<Measurement of Dielectric Constant of Film>

A coating solution prepared as described above was spin-coated onto an 8-inch bare silicon wafer having a substrate resistance of 7 Ω/cm by using "ACT-8 SOD" (spin coater, product of Tokyo Electron). The coat was baked at 110° C. for 60 seconds and then, at 200° C. for 60 seconds and then, baked for 60 minutes in a clean oven of 400° C. purged with nitrogen to obtain a film having a thickness of 100 nm. The specific dielectric constant of the resulting film was calculated from the electric capacitance value thereof measured at 1 MHz by using a mercury probe manufactured by Four Dimensions and HP4285A LCR meter manufactured by Yokogawa Hewlett Packard. The dielectric constant immediately after baking in the clean oven is designated as Dielectric constant (1).

<Evaluation on Dielectric Constant Restoration Property by Heat Treatment>

The insulating films obtained using the coating solutions in the above-described manner were exposed for 12 hours to an environment of temperature of 110° C. and humidity of 90% RH in a highly accelerated stress test system "EHS-221" (M) manufactured by ESPEC CORP. Measurement of a dielectric constant of the films after the test revealed that any of the films had a dielectric constant higher by about 0.1 to 0.4 compared with Dielectric constant (1), that is, a dielectric constant immediately after curing. This is presumed to occur because of the influence of moisture absorbed in the film exposed to high-temperature vapor. Then, restoration of the dielectric constant of the films was tried by heating them at 350° C. for 5 minutes in a chamber having a vacuum degree of about 1 Pa to evaporate moisture incorporated in the films. As a result, any of the films substantially recovered Dielectric constant (1), that is, a dielectric constant immediately after curing. Each of the films was subjected to an accelerated aging test under high-temperature high-humidity environment and heating treatment in vacuum four times in total and the final dielectric constant of each film was designated as Dielectric constant (2). A difference between Dielectric constant (2) and Dielectric constant (1) was designated as an index of dielectric constant restoration property. When the dielectric constant of a film after four-times repetition coincided completely with Dielectric constant (1), that is, a dielectric constant immediately after curing, the difference is obviously 0. The results are collectively shown in Table 1.

TABLE 1

| Raw material monomer for high molecular weight compound (A) | High molecular weight compound (A), weight-average molecular weight | Amount of organic silicone compound (C), wt % | Solvent (B) | Dielectric constant (1) | Restoration of dielectric constant by heat treatment (Dielectric constant (2) − Dielectric constant (1)) |
|---|---|---|---|---|---|
| Examples | | | | | |
| 1 (a) | 21200 | (C-d) 3.0 wt % | (B-a) | 2.40 | 0.02 |
| 2 | | (C-d) 6.0 wt % | (B-a) | 2.38 | 0.00 |
| 3 | | (C-a) 6.0 wt % | (B-a) | 2.41 | 0.01 |
| 4 | | (C-c) 6.0 wt % | (B-a) | 2.40 | 0.00 |
| 5 | | (C-f) 6.0 wt % | (B-a) | 2.38 | 0.01 |
| 6 | 35000 | (C-b) 7.0 wt % | (B-a):(B-b) = 8:2 | 2.43 | 0.02 |
| 7 | | (C-d) 5.0 wt % | (B-a) | 2.39 | 0.00 |
| 8 | | (C-c) 5.0 wt % | (B-a) | 2.40 | 0.01 |
| 9 | | (C-d) 10.0 wt % | (B-a) | 2.37 | 0.00 |
| 10 | | (C-e) 3.0 wt % | (B-a):(B-b) = 9:1 | 2.43 | 0.01 |
| 11 | 76000 | (C-b) 3.0 wt % | (B-a):(B-b) = 8:2 | 2.42 | 0.02 |
| 12 | | (C-d) 5.0 wt % | (B-a):(B-b) = 8:2 | 2.38 | 0.00 |
| 13 | | (C-f) 5.0 wt % | (B-a) | 2.35 | 0.01 |
| 14 (b) | 26200 | (C-a) 10.0 wt % | (B-a) | 2.55 | 0.02 |
| 15 | | (C-c) 5.0 wt % | (B-a) | 2.52 | 0.01 |
| 16 | | (C-c) 10.0 wt % | (B-a):(B-b) = 8:2 | 2.50 | 0.00 |
| 17 (c) | 12300 | (C-d) 5.0 wt % | (B-a) | 2.48 | 0.01 |
| 18 | | (C-d) 10.0 wt % | (B-a) | 2.45 | 0.00 |
| 19 | | (C-f) 10.0 wt % | (B-a) | 2.43 | 0.01 |

TABLE 1-continued

| Raw material monomer for high molecular weight compound (A) | High molecular weight compound (A), weight-average molecular weight | Amount of organic silicone compound (C), wt % | Solvent (B) | Dielectric constant (1) | Restoration of dielectric constant by heat treatment (Dielectric constant (2) − Dielectric constant (1)) |
|---|---|---|---|---|---|
| 20 (c) | 15600 | (C-b) 5.0 wt % | (B-a) | 2.45 | 0.01 |
| 21 | | (C-d) 5.0 wt % | (B-a) | 2.39 | 0.00 |
| 22 | | (C-d) 10.0 wt % | (B-a):(B-b) = 8:2 | 2.36 | 0.00 |
| 23 (e) | 21100 | (C-b) 5.0 wt % | (B-a) | 2.51 | 0.02 |
| 24 | | (C-d) 5.0 wt % | (B-a) | 2.48 | 0.00 |
| 25 | | (C-d) 10.0 wt % | (B-a) | 2.45 | 0.00 |
| 26 | | (C-f) 5.0 wt % | (B-a) | 2.42 | 0.01 |
| 27 (I-a) | 89600 | (C-a) 7.0 wt % | (B-e) | 2.25 | 0.02 |
| 28 | | (C-c) 10.0 wt % | (B-e) | 2.20 | 0.00 |
| 29 | | (C-d) 10.0 wt % | (B-e) | 2.20 | 0.00 |
| 30 | | (C-f) 6.0 wt % | (B-a) | 2.15 | 0.01 |
| 31 (I-d) | 96870 | (C-a) 7.0 wt % | (B-e) | 2.28 | 0.03 |
| 32 | | (C-b) 12.0 wt % | (B-e) | 2.28 | 0.02 |
| 33 | | (C-d) 5.0 wt % | (B-e) | 2.24 | 0.00 |
| 34 | | (C-f) 6.0 wt % | (B-a) | 2.20 | 0.01 |

TABLE 1-continued

| | Raw material monomer for high molecular weight compound (A) | High molecular weight compound (A), weight-average molecular weight | Amount of organic silicone compound (C), wt % | Solvent (B) | Dielectric constant (1) | Restoration of dielectric constant by heat treatment (Dielectric constant (2) − Dielectric constant (1)) |
|---|---|---|---|---|---|---|
| 35 | (f) and (g) | 38000 | (C-b) 12.0 wt % | (B-a):(B-c) = 9:1 | 2.66 | 0.02 |
| 36 | | | (C-c) 6.0 wt % | (B-a):(B-c) = 9:1 | 2.63 | 0.01 |
| 37 | | | (C-d) 5.0 wt % | (B-a):(B-c) = 9:1 | 2.62 | 0.00 |
| 38 | | | (C-d) 5.0 wt % | (B-a) | 2.62 | 0.00 |
| 39 | | | (C-f) 10.0 wt % | (B-a) | 2.55 | 0.00 |
| 40 | (h) | 31000 | (C-a) 6.0 wt % | (B-a):(B-d) = 8:2 | 2.48 | 0.02 |
| 41 | | | (C-d) 5.0 wt % | (B-d) | 2.51 | 0.00 |
| 42 | | | (C-d) 5.0 wt % | (B-a):(B-d) = 8:2 | 2.50 | 0.01 |
| 43 | | | (C-f) 5.0 wt % | (B-d) | 2.43 | 0.00 |

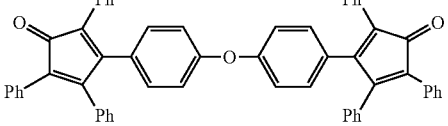
(f)
and

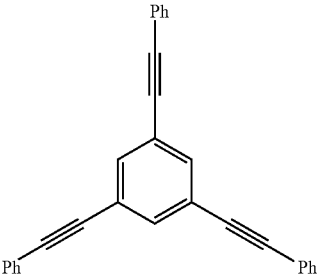
(g)

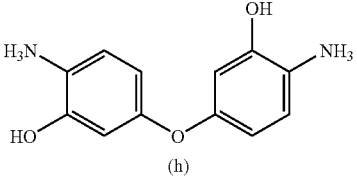
(h)

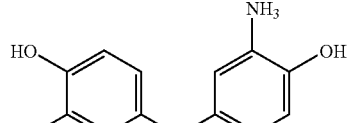
(i)

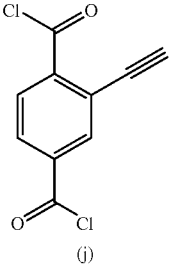
(j)

TABLE 1-continued

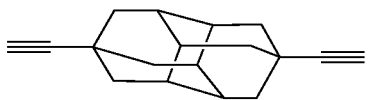

(C-a): "PDM-1922" (trade name of dimethylsiloxane-diphenylsiloxane copolymer, product of Gelest)
(C-b): "SH550" (trade name of methyl phenyl silicone oil, product of Dow Corning Toray)
(C-c): "ALT-213" (trade name of (ethylmethylsiloxane)-[(2-phenylpropyl)methylsiloxane] copolymer, product of Gelest)
(C-d): "ALT-233" (trade name of N-hexylmethylsiloxane)-[(2-phenylpropyl)methylsiloxane] copolymer, product of Gelest)
(C-e): "SH203" (trade name of (alkylmethylsiloxane)-(dimethylsiloxane) copolymer, product of Dow Corning Toray)
(C-f): "FMS-123" (trade name of poly(3,3,3-trifluoropropylmethylsiloxane), product of Gelest)
(C-x): "DBE-224" (trade name of (dimethylsiloxane)-[(polyethylene oxide)methylsiloxane] block copolymer, product of Gelest) (silicone compound for comparison)
(B-a): Cyclohexanone
(B-b): 2-Heptanone
(B-c): γ-Butyrolactone
(B-d): NMP (N-methyl-2-pyrrolidone)
(B-e): Propylene glycol methyl acetate
"Amount of organic silicone compound (C)" in the table is an amount based on a total solid content (polymer (A) and organic silicone compound (C)).

From the results shown in Table 1, it has been found that not only the insulating films formed using the insulating film forming compositions of the invention have a reduced dielectric constant but also their dielectric constant restoration property by heating is improved even if their dielectric constant increases once with the passage of time and they can restore their dielectric constant substantially to that immediately after film formation.

The present invention makes it possible to provide a composition for forming an insulating film suited for use as an inter layer insulating film in electronic devices, having a low dielectric constant, and having an improved capacity (k-value restoration capacity) for restoring, by heat treatment, an original dielectric constant which has once increased with the passage of time after film formation; and an electronic device having an insulating film formed using the composition.

The entire disclosure of each and every foreign patent application from which the benefit of foreign priority has been claimed in the present application is incorporated herein by reference, as if fully set forth.

What is claimed is:

1. An insulating film forming composition, comprising:
(A) at least one organic polymer, wherein the at least one organic polymer is a polymer of a monomer having at least one repeating unit containing a cage structure;
(B) a solvent; and
(C) at least one organic silicone compound represented by any of the following formulas (C-1) to (C-3):

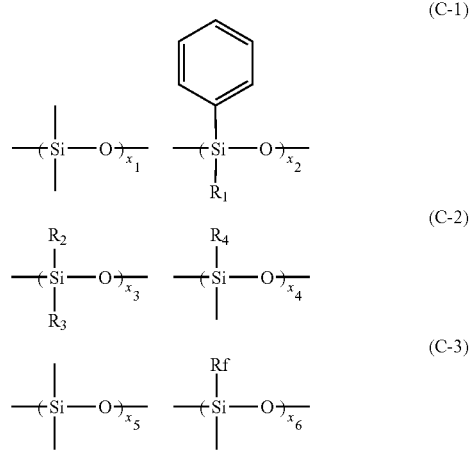

wherein,
in formula (C-1), $R_1$ represents a methyl group or phenyl group; and $x_1$ is from 0 to 95 mol % and $x_2$ is from 5 to 100 mol %, with the proviso that $x_1+x_2=100$ mol %;
in formula (C-2), $R_2$ and $R_3$ each represents an alkyl group, with the proviso that at least one of $R_2$ and $R_3$ represents an alkyl group having 2 or more carbon atoms; $R_4$ represents a methyl group or a 2-phenylpropyl group; and $x_3$ is from 5 to 100 mol % and $x_4$ is from 0 to 95 mol %, with the proviso that $x_3+x_4=100$ mol %; and
in formula (C-3), Rf represents a fluoroalkyl group; and $x_5$ is from 0 to 95 mol % and $x_6$ is from 5 to 100 mol %, with the proviso that $x_5+x_6=100$ mol %.

2. The insulating film forming composition according to claim 1,
wherein the at least one organic silicone compound (C) is at least one compound represented by formula (C-2).

3. The insulating film forming composition according to claim 1,
wherein the at least one organic polymer (A) is a polymer of a monomer containing a cage structure and having a polymerizable carbon-carbon double bond or carbon-carbon triple bond.

4. The insulating film forming composition according to claim 1,
wherein the cage structure is selected from the group consisting of adamantane, biadamantane, diamantane, triamantane, tetramantane and dodecahedrane.

5. The insulating film forming composition according to claim 4,
wherein the monomer containing a cage structure is selected from the group consisting of the following formulas (I) to (VI):

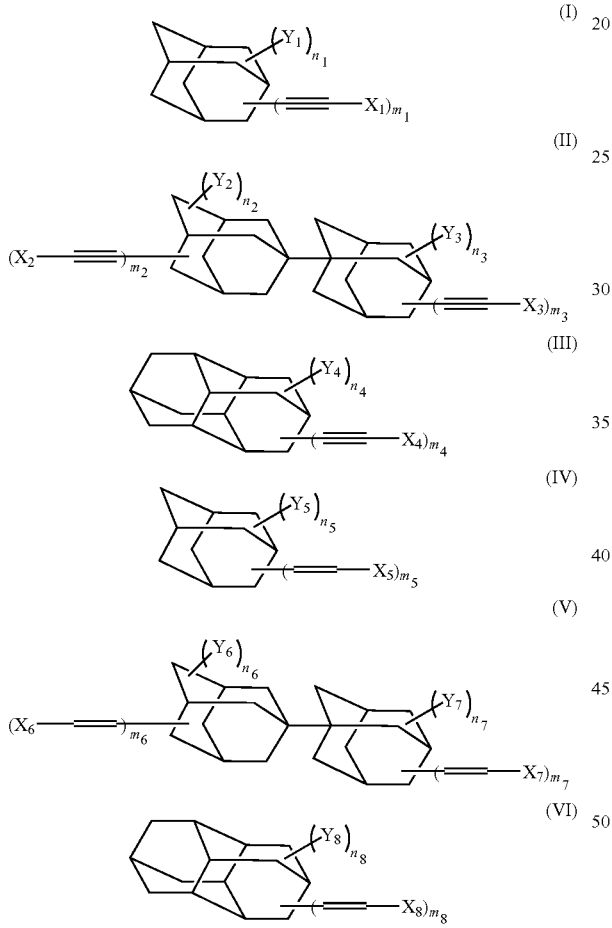

wherein, in the formulas (I) to (VI),
$X_1(s)$ to $X_8(s)$ each independently represents a hydrogen atom, an alkyl group, an alkenyl group, an alkynyl group, an aryl group, a silyl group, an acyl group, an alkoxycarbonyl group or a carbamoyl group;
$Y_1(s)$ to $Y_8(s)$ each independently represents a halogen atom, an alkyl group, an aryl group or a silyl group;
$m_1$ and $m_5$ each independently stands for an integer from 1 to 16;
$n_1$ and $n_5$ each independently stands for an integer from 0 to 15;
$m_2$, $m_3$, $m_6$ and $m_7$ each independently stands for an integer from 1 to 15;
$n_2$, $n_3$, $n_6$ and $n_7$ each independently stands for an integer from 0 to 14;
$m_4$ and $m_8$ each independently stands for an integer from 1 to 20; and
$n_4$ and $n_8$ each independently stands for an integer from 0 to 19.

6. An electronic device, comprising:
an insulating film formed from the insulating film forming composition according to claim 1.

7. An insulating film forming composition, comprising:
(A) a high molecular weight compound obtained by polymerizing a cage-type silsesquioxane compound having two or more unsaturated groups as substituents;
(B) a solvent; and
(C) at least one organic silicone compound represented by any of the following formulas (C-1) to (C-3):

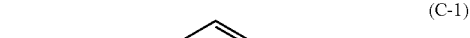
(C-1)

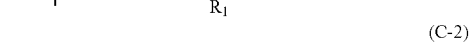
(C-2)

(C-3)

wherein,
in formula (C-1), $R_1$ represents a methyl group or a phenyl group; and $x_1$ is from 0 to 95 mol % and $x_2$ is from 5 to 100 mol %, with the proviso that $x_1+x_2=100$ mol %;
in formula (C-2), $R_2$ and $R_3$ each represents an alkyl group, with the proviso that at least one of $R_2$ and $R_3$ represents an alkyl group having 2 or more carbon atoms; $R_4$ represents a methyl group or a 2-phenylpropyl group; and $x_3$ is from 5 to 100 mol % and $x_4$ is from 0 to 95 mol %, with the proviso that $x_3+x_4=100$ mol %; and
in formula (C-3), Rf represents a fluoroalkyl group; and $x_5$ is from 0 to 95 mol % and $x_6$ is from 5 to 100 mol %, with the proviso that $x_5+x_6=100$ mol %.

8. The insulating film forming composition according to claim 7,
wherein the at least one organic silicone compound (C) is at least one compound represented by formula (C-2).

9. The insulating film forming composition according to claim 7,
wherein the cage-type silsesquioxane compound serving as a raw material of the high molecular weight compound (A) is selected from the group consisting of the following formulas (Q-1) to (Q-6):

(Q-1)
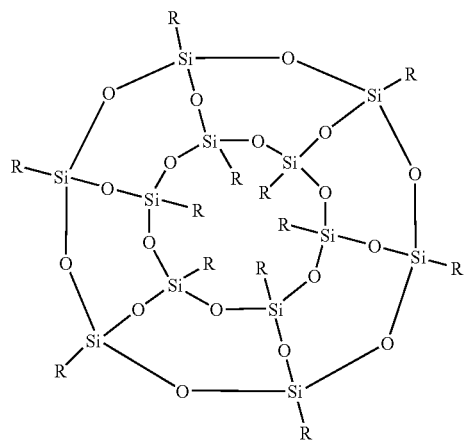
(Q-2)
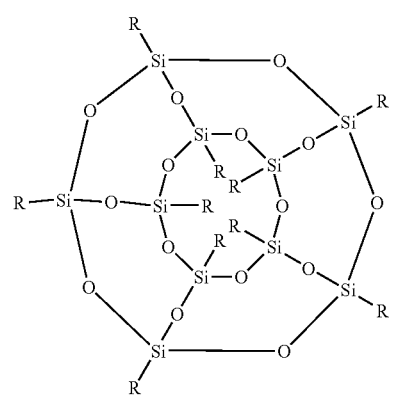
(Q-3)
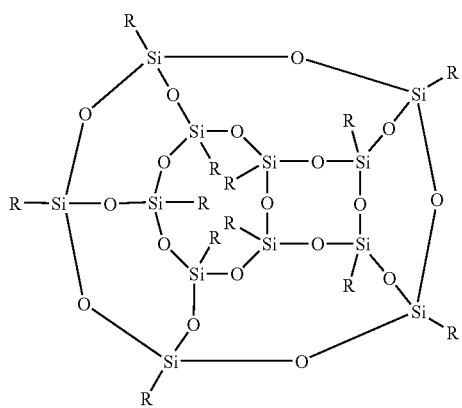
-continued
(Q-4)
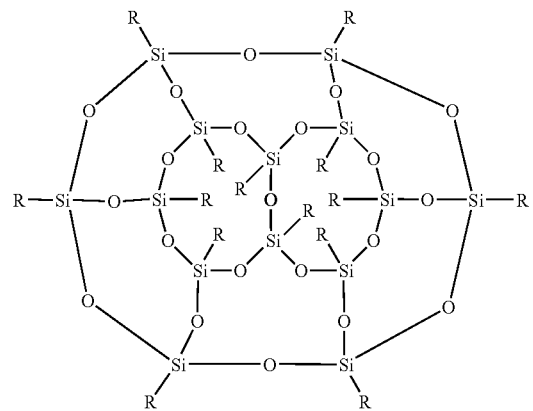
(Q-5)
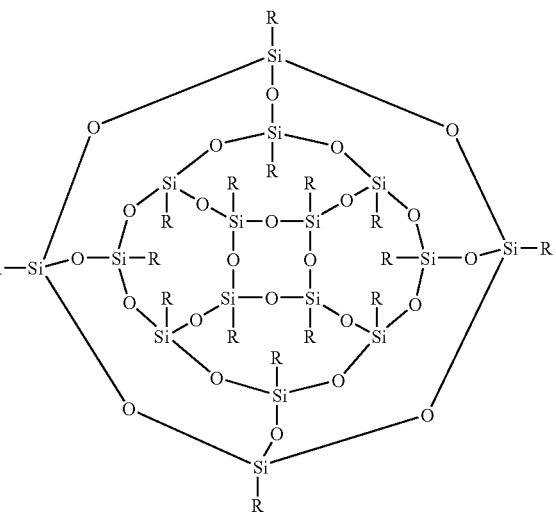
(Q-6)
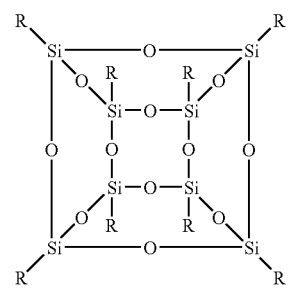
wherein,
R's each independently represents a non-hydrolyzable group with the proviso that at least two of R's represent a vinyl- or ethynyl-containing group.
10. An electronic device, comprising:
an insulating film formed from the insulating film forming composition according to claim 7.
* * * * *